US010190070B2

(12) United States Patent
Goldblatt et al.

(10) Patent No.: US 10,190,070 B2
(45) Date of Patent: Jan. 29, 2019

(54) MULTIPLE-FUNCTION DISPERSANT GRAFT POLYMER

(75) Inventors: Irwin L. Goldblatt, Edison, NJ (US); Shean-Jer Chen, Bridgewater, NJ (US); Richard P. Sauer, North Plainfield, NJ (US)

(73) Assignee: Castrol Limited, Swindon (GB)

( * ) Notice: Subject to any disclaimer, the term of this patent is extended or adjusted under 35 U.S.C. 154(b) by 1370 days.

(21) Appl. No.: 11/912,847

(22) PCT Filed: Apr. 27, 2006

(86) PCT No.: PCT/US2006/016182
§ 371 (c)(1),
(2), (4) Date: Jun. 3, 2008

(87) PCT Pub. No.: WO2006/116663
PCT Pub. Date: Nov. 2, 2006

(65) Prior Publication Data
US 2008/0293600 A1 Nov. 27, 2008

Related U.S. Application Data

(60) Provisional application No. 60/675,773, filed on Apr. 28, 2005.

(51) Int. Cl.
| C10M 149/10 | (2006.01) |
| C08F 8/32 | (2006.01) |
| C08F 255/04 | (2006.01) |
| C08F 285/00 | (2006.01) |
| C10M 177/00 | (2006.01) |

(52) U.S. Cl.
CPC ............. *C10M 149/10* (2013.01); *C08F 8/32* (2013.01); *C08F 255/04* (2013.01); *C08F 285/00* (2013.01); *C10M 177/00* (2013.01); *C10M 2205/022* (2013.01); *C10M 2205/024* (2013.01); *C10M 2215/28* (2013.01); *C10M 2215/30* (2013.01); *C10M 2217/028* (2013.01); *C10M 2217/06* (2013.01); *C10M 2219/09* (2013.01); *C10N 2230/04* (2013.01); *C10N 2230/041* (2013.01); *C10N 2260/09* (2013.01); *C10N 2270/00* (2013.01)

(58) Field of Classification Search
CPC .......... C10M 149/10; C10M 2205/022; C10M 2205/024; C10M 2215/28; C10M 2215/30; C10M 2217/028; C10M 2217/06; C10M 2219/09; C10N 2230/04; C10N 2230/041; C10N 2270/00; C08F 8/32; C08F 255/04; C08F 285/00
USPC ........ 525/242, 243, 279, 281, 296; 508/221, 508/459, 279, 281, 282, 283, 293, 296, 508/309, 315, 543
See application file for complete search history.

(56) References Cited

U.S. PATENT DOCUMENTS

| 3,873,459 A | 3/1975 | Pawlak |
| 4,089,794 A | 5/1978 | Engel |
| 4,092,255 A | 5/1978 | Chapelet et al. |
| 4,137,185 A | 1/1979 | Gardiner et al. |
| 4,146,489 A | 3/1979 | Stambaugh et al. |
| 4,160,739 A | 7/1979 | Stambaugh et al. |
| 4,320,019 A | 3/1982 | Hayashi |
| 4,505,834 A | 3/1985 | Papay |
| 4,517,104 A | 5/1985 | Bloch et al. |
| 4,632,769 A | 12/1986 | Gutierrez et al. |
| 4,640,788 A | 2/1987 | Kapuscinski |
| 4,693,838 A | 9/1987 | Varma et al. |
| 4,780,228 A | 10/1988 | Gardiner et al. |
| 4,780,230 A | 10/1988 | Liu et al. |
| 4,810,754 A | 3/1989 | McCrary |
| 4,812,261 A | 3/1989 | Liu et al. |
| 4,877,834 A | 3/1989 | Liu et al. |
| 4,863,623 A | 9/1989 | Nalesnick |
| 4,904,401 A | 2/1990 | Ripple |
| 4,904,404 A | 2/1990 | Liu et al. |
| 4,969,912 A | 11/1990 | Kelman et al. |
| 5,149,895 A | 9/1992 | Coolbaugh et al. |
| 5,167,845 A | 12/1992 | Derosa |
| 5,167,848 A * | 12/1992 | Chung et al. ............. 508/293 |

(Continued)

FOREIGN PATENT DOCUMENTS

| CN | 1137283 | 12/1996 |
| DE | 19607641 A1 | 9/1997 |

(Continued)

OTHER PUBLICATIONS

Moad, G., The synthesis of polyolefin graft copolymers by reactive extrusion, Prog. Polym. Sci. 24 (1999) 81-142.
Citovicky, P., et al., The copolymerization of styrene and maleic anhydride initiated by peroxides of isotactic polypropylene, Eur. Polym. J. (1996) vol. 32, No. 2, 153-158.
Deng, J. et al., Grafting copolymerization of styrene and maleic anhydride binary monomer systems induced by UV irradiation, Eur. Polym. J. 41 (2005) 2685-2692.
Li, Y., et al., Study on styrene-assisted melt free-radical grafting of maleic anhydride onto polypropylene, Polymer 42 3419-3425 (2001).
Zu, Jianhua et al., "The Preparation of Sodium Styrene Sulfonatepolyethylene Grafted Membranes", Journal of Radiation Research and Radiation Processing, vol. 1 18(3), 168-169 (2000), with English abstract.

(Continued)

Primary Examiner — Latosha Hines
(74) Attorney, Agent, or Firm — McDonnell Boehnen Hulbert & Berghoff LLP

(57) ABSTRACT

A grafted polymer, either polyolefin or polyester, containing monomers associated with sludge and varnish control as well as monomers associated with soot handling to provide a graft polymer exhibiting multiple performance attributes. Also described are methods for manufacturing these novel multiple-function graft polymers via solution and melt processes. Lubricating oil compositions containing these novel multiple-function polymers as an additive that display performance characteristics directed to good soot handling and sludge and varnish control as well as control of viscosity increase are described.

22 Claims, No Drawings

(56) References Cited

U.S. PATENT DOCUMENTS

| | | | |
|---|---|---|---|
| 5,219,480 A | 6/1993 | Gutierrez | |
| 5,275,747 A * | 1/1994 | Gutierrez et al. | 508/241 |
| 5,294,354 A | 3/1994 | Papke | |
| 5,298,565 A | 3/1994 | Lange | |
| 5,328,624 A | 7/1994 | Chung | |
| 5,346,635 A | 9/1994 | Khorramian | |
| 5,424,357 A | 6/1995 | Larson | |
| 5,424,367 A | 6/1995 | Auda | |
| 5,427,702 A | 6/1995 | Chung | |
| 5,439,605 A | 8/1995 | Khorramian | |
| 5,523,008 A | 6/1996 | Boden et al. | |
| 5,527,624 A | 6/1996 | Higgins et al. | |
| 5,563,118 A | 10/1996 | Mishra et al. | |
| 5,633,415 A | 5/1997 | Brandes et al. | |
| 5,637,783 A | 6/1997 | Brandes et al. | |
| 5,652,201 A | 7/1997 | Paypay | |
| 5,663,126 A | 9/1997 | Boden et al. | |
| 5,759,967 A | 6/1998 | Song | |
| 5,773,524 A | 6/1998 | Coolbaugh et al. | |
| 5,780,540 A | 7/1998 | Brandes et al. | |
| 5,814,586 A | 9/1998 | Boden et al. | |
| 5,874,389 A | 2/1999 | Boden et al. | |
| 6,034,038 A | 3/2000 | Lockwood et al. | |
| 6,034,184 A | 3/2000 | Coolbaugh et al. | |
| 6,054,539 A | 4/2000 | Coolbaugh et al. | |
| 6,100,224 A | 8/2000 | Peiffer et al. | |
| 6,103,676 A | 8/2000 | Coolbaugh et al. | |
| 6,107,257 A | 8/2000 | Valcho et al. | |
| 6,162,768 A | 12/2000 | Coolbaugh et al. | |
| 6,187,721 B1 * | 2/2001 | Goldblatt | C10M 149/06 508/221 |
| 6,215,033 B1 | 4/2001 | Coolbaugh et al. | |
| 6,228,817 B1 | 5/2001 | Coolbaugh et al. | |
| 6,248,702 B1 | 6/2001 | Coolbaugh et al. | |
| 6,300,289 B1 | 10/2001 | Boden et al. | |
| 6,319,881 B1 | 11/2001 | Coolbaugh et al. | |
| 6,410,652 B1 | 6/2002 | Goldblatt et al. | |
| 6,472,353 B1 | 10/2002 | Smoggie et al. | |
| 6,686,321 B2 | 2/2004 | Boden et al. | |
| 6,715,473 B2 | 4/2004 | Ritchie et al. | |
| 6,750,183 B2 | 6/2004 | Gutierrez et al. | |
| 6,759,375 B2 | 7/2004 | Curtis et al. | |
| 6,767,871 B2 | 7/2004 | Devlin et al. | |
| 6,939,420 B2 | 9/2005 | Pollack | |
| 7,144,951 B2 | 12/2006 | Dyuck et al. | |
| 7,253,231 B2 | 8/2007 | Devlin et al. | |
| 7,371,713 B2 | 5/2008 | Goldblatt et al. | |
| 2004/0042349 A1 | 3/2004 | Leuba et al. | |
| 2004/0043909 A1 * | 3/2004 | Goldblatt | C08F 8/30 508/221 |
| 2004/0259742 A1 | 12/2004 | Mishra et al. | |
| 2005/0192407 A1 | 9/2005 | Gauthy | |
| 2005/0209113 A1 | 9/2005 | Goldblatt | |
| 2006/0003905 A1 | 1/2006 | Devlin et al. | |
| 2006/0025316 A1 | 2/2006 | Covitch et al. | |
| 2006/0205611 A1 | 9/2006 | Sauer | |
| 2007/0149414 A1 | 6/2007 | Ruhe et al. | |
| 2008/0293600 A1 | 11/2008 | Goldblatt | |

FOREIGN PATENT DOCUMENTS

| | | |
|---|---|---|
| EP | 0000648 | 2/1979 |
| EP | 0336716 | 10/1989 |
| EP | 0352070 | 1/1990 |
| EP | 0352072 | 1/1990 |
| EP | 0 438 848 | 7/1991 |
| EP | 0837122 | 4/1998 |
| EP | 0927754 | 7/1999 |
| EP | 0980891 | 2/2000 |
| EP | 1533293 | 5/2005 |
| GB | 989589 | 8/1963 |
| GB | 1390851 | 4/1975 |
| GB | 1 531 945 | 11/1978 |
| GB | 2097800 | 11/1982 |
| IN | IN738/MMNP/2004 | 4/2005 |
| JP | H10508051 A | 8/1998 |
| JP | 2001-524580 A | 12/2001 |
| JP | 2005042116 A | 2/2005 |
| SG | 112056 | 6/2005 |
| WO | WO95/16744 | 6/1995 |
| WO | WO95/18199 | 6/1995 |
| WO | WO09612746 A1 | 5/1996 |
| WO | WO 9747709 | 12/1997 |
| WO | 98/17696 | 4/1998 |
| WO | WO 00/37449 | 6/2000 |
| WO | WO01/19882 | 3/2001 |
| WO | WO 03020853 | 3/2003 |
| WO | WO03/099890 | 12/2003 |
| WO | WO 06084698 | 8/2006 |
| WO | WO06/099250 | 9/2006 |
| WO | WO06/116663 | 11/2006 |
| WO | WO 06133848 | 12/2006 |

OTHER PUBLICATIONS

European Search Report corresponding to European Patent Application Serial No. 03734186.4-1214 dated Aug. 7, 2008, 5 pages.

Aldrich Handbook of Fine Chemicals; 1996-1997; p. 986; Cat. No. 14607-2; "N,N' Methylenebisacrylamide".

Australian Patent Office Search Report Application No. SG 200406722-9, dated Feb. 24, 2006.

European Search Report corresponding to European Patent Application Serial No. 04257231.3-2103, dated Mar. 28, 2006.

Russian Patent Office, Official Action dated May 21, 2010 in Russian Application No. 2070144073/04.

Government of India Patent Office, First Examination Report in Application No. 4804/CHENP/2007, dated Nov. 20, 2013. (2 pages).

* cited by examiner

US 10,190,070 B2

MULTIPLE-FUNCTION DISPERSANT GRAFT POLYMER

This application claims the benefit of U.S. Provisional Patent Application No. 60/675,773 filed Apr. 28, 2005, which is incorporated herein by reference in its entirety.

TECHNICAL FIELD

The present invention relates to novel multiple function graft polymers, wherein the backbone polymer is a polyolefin or polyester, and their manufacture and use. The polyolefin and polyester backbone polymers are grafted with monomers associated with sludge and varnish control as well as monomers associated with soot handling and viscosity control to provide a graft polymer exhibiting multiple performance attributes.

The present invention further relates to the method for manufacturing these novel multiple-function graft polymers.

The invention still further relates to lubricating oil compositions containing these novel multiple-function polymers as an additive, which display performance characteristics directed to good soot handling and sludge and varnish control as well as control of viscosity increase.

BACKGROUND OF THE INVENTION

Currently, a variety of additives are used to control specific performance characteristics of lubricating oil. For example, detergents such as highly basic metal salts are useful for keeping the insoluble particulate materials in an engine or other machinery in suspension. Dispersants, such as succinimides having molecular weight from about 700 to about 10,000, also maintain oil insolubles in suspension in the fluid, thus preventing sludge flocculation and precipitation or deposition of particulates on metal parts. Antioxidants such as dioctylphenylamine and phenyl-alpha-naphthylamine reduce the tendency of mineral oils to deteriorate in service. This deterioration can be evidenced by the products of oxidation such as sludge and varnish-like deposits on the metal surfaces, and the formation of soot and the concomitant increase in viscosity caused by soot in the oil.

Graft polyolefins containing nitrogen-containing and/or oxygen-containing monomers for use as dispersant viscosity index improvers are also known. U.S. Pat. No. 5,523,008, the disclosure of which is incorporated herein by reference in its entirety, describes a grafted polyolefin containing at least about 13 moles of N-vinylimidazole or other ethylenically-unsaturated nitrogen-containing and/or oxygen-containing monomers per mole of a grafted polyolefin backbone. Also described is a lubricating oil comprising a lubricant base oil and a grafted polyolefin as described above as well as a method of making a dispersant-viscosity index improver. N-vinylimidazole or other ethylenically unsaturated nitrogen-containing and/or oxygen-containing monomers and a graftable polyolefin are reacted with sufficient initiator to graft at least about 13 moles of the monomer to each mole of the polyolefin.

U.S. Pat. No. 5,663,126, and U.S. Pat. No. 6,686,321, the disclosures of which are incorporated herein by reference in their entireties, describe a grafted polyolefin containing one or more of N-vinylimidazole, 4-vinylpyridine, or other ethylenically-unsaturated nitrogen-containing and/or oxygen-containing graftable monomers grafted to a polyolefin copolymer. Also described are lubricating oil compositions comprising a lubricant base oil and a grafted polymer as described above as well as methods of making dispersant viscosity index improvers.

Each of the additives is a separate component of the formulated lubricating oil and adds cost. Thus, it would be beneficial to have a multi-functional additive that controls more than one performance characteristic of the lubricating oil.

We have now discovered a novel multi-function graft polymer useful as an additive for lubricating oil compositions to control soot, sludge, and varnish as well as viscosity increase.

SUMMARY OF THE INVENTION

One embodiment of the invention is a multifunctional grafted polymer containing two groups of monomers grafted to a polyolefin or polyester backbone, one group of monomers to impart dispersancy as well as another group of monomers to impart soot handling. Generally, one group of monomers comprising ethylenically unsaturated, aliphatic or aromatic monomers having 2 to about 50 carbon atoms containing oxygen or nitrogen, or both oxygen and nitrogen are contemplated for use as graftable monomers imparting dispersancy which is associated with sludge and varnish handling. Another group of monomers, the "graftable coupling agents" such as the "acyl group", which can provide acyl groups for reaction, reacts with amines forming substituents suitable for imparting soot handling performance. In general, the amines are comprised of primary and secondary amines that can undergo a condensation reaction with an appropriate acylating agent (an agent that introduces an acyl group into a molecule). An acyl group is represented by the formula:

The multifunctional grafted polymer of the present invention contains from about 2 moles of total graft monomer to about 75 moles total graft monomer per mole of polymer.

Another embodiment of the invention is a lubricating oil comprising a hydrocarbon base oil and a multifunctional grafted polymer described above. The multifunctional grafted polyolefin or polyester functions as an additive to control sludge, varnish as well as soot and viscosity increase. Such lubricating oils utilize both (a) the superior dispersancy and (b) the soot control properties of the multi-functional grafted polymers of the present invention, thereby requiring fewer additives.

Some of the advantages of the present invention include the ability to control or adjust product potency, the ability to manufacture "fit-for-use" product lines through the choice of monomer and the choice of molar ratios of monomer to polymer backbone. The present invention provides a way to achieve additive cost control and the multifunctional grafted polymer of the present invention also provides advantages in sludge and varnish control and soot and viscosity control as compared with physical mixtures of additives.

Another embodiment of the invention is a method of making a multi-functional graft polymer containing two groups of monomers grafted to a polyolefin or polyester backbone, one group of monomers to impart dispersancy as well as another group of monomers to impart soot handling.

In this embodiment, the grafting sequence is important in order to generate the multi-functional graft polymer described herein. To achieve good performance with respect to both soot handling and sludge and varnish control it is important to first graft a graftable coupling agent, such as an acylating agent, such as maleic anhydride, onto the polymer backbone, forming a polymer containing acyl groups, for example, succinic anhydride groups. Next, the monomer or monomer grouping associated with sludge and varnish handling, for example N-vinylimidazole, is introduced. Finally, the amine or amines capable of undergoing a reaction with the acyl group, for example a succinic anhydride group, is introduced and reacted with the acylated polymer thereby imparting soot handling performance to the graft polymer.

DETAILED DESCRIPTION OF THE INVENTION

While the invention will be described in connection with one or more preferred embodiments, it will be understood that the invention is not limited to those embodiments. On the contrary, the invention includes all alternatives, modifications and equivalents as may be included within the spirit and scope of the appended claims.

An embodiment of the invention relates to a multiple function dispersant polymer comprising a graft polymer of:
a. at least one polymer backbone having graftable sites;
b. at least one acylating agent having at least one point of olefinic unsaturation;
c. at least one, ethylenically unsaturated, aliphatic or aromatic monomer having from 2 to about 50 carbon atoms and containing at least one member selected from the group consisting of nitrogen, oxygen, and combinations thereof; and
d. at least one amine capable of reacting with said acylating agent.

In the multiple function dispersant polymer of the present invention, the polymer backbone may be selected from the group consisting of polyolefins, polyesters, and combinations thereof.

Another embodiment of the present invention relates to a lubricating oil comprising:
a. a lubricant base oil;
b. at least a portion of the multiple function dispersant polymer of claim 1; and, optionally,
c. other lubricating oil additives.

Another embodiment of the present invention relates to a method of improving soot handling, viscosity control, and sludge and varnish control of a lubricating oil which comprises incorporating into said oil an effective amount of the multiple function dispersant polymer of the present invention.

The novel multi-functional polymer according to the present invention is made by reaction of a graftable polyolefin or polyester, either dissolved in a hydrocarbon base stock or in a melt state, with a graftable coupling agent, such as an acylating agent in the presence of an initiator to form a hydrocarbyl acyl composition; for example, when the acylating agent is maleic anhydride, an acylated polymer having anhydride groups is formed. The acylated polymer thus formed is then reacted with one or more monomers capable of imparting sludge and varnish handling properties in the presence of an initiator. Finally, one or more amines suitable for imparting soot handling performance is reacted with the anhydride groups to provide the multifunctional polymer of the present invention.

In preparing the multi-functional graft polymer of the present invention as described above, more than one polyolefin or polyester or mixtures of one or more polyolefins and/or polyesters can be used. More than one acylating agent, monomer capable of imparting sludge and varnish handling properties, initiator, and amine can be used as well.

Another embodiment of the present invention relates to a method of making a multiple function dispersant graft polymer comprising the steps of:
(a) reacting a polymer backbone having graftable sites and an acylating agent having at least one point of olefinic unsaturation in the presence of an initiator to form a graft polymer reaction product of the acylating agent and polymer backbone;
(b) reacting the graft polymer reaction product formed in step (a) with an ethylenically unsaturated, aliphatic or aromatic monomer having from 2 to about 50 carbon atoms and containing at least one member selected from the group consisting of nitrogen, oxygen, and combinations thereof, in the presence of an initiator to form a graft polymer reaction product of the ethylenically unsaturated monomer, the acylating agent, and the polymer backbone having acyl groups available for reaction; and
(c) reacting the graft polymer reaction product formed in step (b) with an amine capable of reacting with said acyl groups to form a multiple function dispersant graft polymer.

Reaction Materials

The following examples of polymers, acylating agents, graftable nitrogen and/or oxygen containing compounds that impart dispersancy, and amines capable of undergoing reactions with graftable coupling agents, such as acylating agents to yield products suitable for handling soot are contemplated for use herein to make the present multifunctional dispersant graft polymer of the invention.

Polymers

A wide variety of polyolefins, modified polyolefins, polyesters, and modified polyesters (which may or may not have pendant unsaturation) are contemplated for use as a backbone for grafting. Examples of such polyolefins and polyesters include homopolymers, copolymers, terpolymers, and higher such as, but not limited to, polyethylene, polypropylene, ethylene-propylene copolymers, polymers containing two or more monomers, polyisobutene, polymethacrylates, polyacrylates, polyalkylstyrenes, partially hydrogenated polyolefins of butadiene and styrene and copolymers of isoprene, such as polymers of styrene and isoprene. EPDM (ethylene/propylene/diene monomer) polymers, ethylene-propylene octene terpolymers and ethylene-propylene ENB terpolymers, are also contemplated for use herein. The use of mixtures of polyolefins as well as mixtures of polyesters for making the multifunctional graft polymer of the present invention is also contemplated. The use of chemical and physical mixtures of polyolefins and polyesters is also contemplated. The polyolefins contemplated herein may have weight average molecular weights of from about 10,000 to about 750,000, alternatively from about 20,000 to about 500,000. Preferred polyolefins may have polydispersities from about 1 to about 15. The polyesters contemplated herein may have weight average molecular weights of from about from about 10,000 to about 1,000,000, alternatively from about 20,000 to about 750,000.

Particular materials contemplated for use herein include ethylene/propylene/diene polyolefins containing from about 30% to about 80% ethylene and from about 70% to about 20% propylene moieties by number, optionally modified with from 0% to about 15% diene monomers. Several examples of diene monomers are 1,4-butadiene, isoprene, 1,4-hexadiene, dicyclopentadiene, 2,5-norbornadiene, ethylidene-norbornene, the dienes recited in U.S. Pat. No. 4,092,255, the disclosure of which is incorporated herein by reference in its entirety, at column 2, lines 36‑44, or combinations of more than one of the aforementioned polymers. Other materials contemplated are polymers derived from mixed alkylacrylates or mixed alkylmethacrylates or combinations thereof.

Specific materials which are contemplated for use herein include the VISNEX polyolefins which are polyolefins comprised of ethylene and propylene sold by Mitsui Petrochemical Industries, Ltd., Tokyo, Japan; also the family of PARATONE polyolefins, such as Paratone 8910, and Paratone 8941, comprised primarily of ethylene and propylene, marketed by Chevron Oronite Company, L.L.C., headquartered in Houston, Tex.; also contemplated are Infineum SV200, Infineum SV250, Infineum SV145, Infineum SV160, Infineum SV300, and Infineum SV150, which are olefin copolymers based on ethylene and/or propylene and/or isoprene marketed by Infineum International, Ltd., Abingdon, UK or Infineum USA LP, Linden, N.J.; elastomers available from DSM are also contemplated, as are polymers marketed under the DUTRAL name by Polimeri Europa, of Ferrara, Italy such as CO-029, CO-034, CO-043, CO-058, TER 4028, TER 4044, TER 4049 and TER 9046. The Uniroyal line of polymers marketed by Crompton Corporation of Middlebury, Conn. under the ROYALENE name such as 400, 501, 505, 512, 525, 535, 556, 563, 580 HT are also contemplated.

Also contemplated for use are polymers such as Viscoplex 3-700, a polyalkyl methacrylate and Viscoplex 2-602, a dispersant mixed polymer which consists of polyalkyl methacrylate coreacted with olefin copolymer.

Combinations of the above materials, and other, similar materials are also contemplated.

Graftable Coupling Agents

The graftable coupling agents used in the present process have at least two component coupling sites, one of which is generally a site of olefinic unsaturation. Among the groups of graftable coupling agents are acylating agents and epoxides.

Acylating Agent

The acylating agent used in the present process has at least one point of olefinic unsaturation in its structure. Usually, the point of olefinic unsaturation will correspond to —HC═CH— or —HC═CH$_2$. Acylating agents where the point of olefinic unsaturation is α, β to a carboxy functional group are very useful. Olefinically unsaturated mono-, di-, and polycarboxylic acids, the lower alkyl esters thereof, the halides thereof, and the anhydrides thereof represent typical acylating agents in accordance with the present invention. Preferably, the olefinically unsaturated acylating agent is a mono- or dibasic acid, or a derivative thereof such as anhydrides, lower alkyl esters, halides and mixtures of two or more such derivatives. "Lower alkyl" means alkyl groups having one to seven carbon atoms.

The acylating agent may include at least one member selected from the group consisting of monounsaturated $C_4$ to $C_{50}$, alternatively $C_4$ to $C_{20}$, alternatively $C_4$ to $C_{10}$, dicarboxylic acids monounsaturated $C_3$ to $C_{50}$, alternatively $C_3$ to $C_{20}$, alternatively $C_3$ to $C_{10}$, monocarboxylic acids and anhydrides thereof (that is, anhydrides of those carboxylic acids or of those monocarboxylic acids), and combinations of any of the foregoing acids and/or anhydrides.

Suitable acylating agents include acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, methylcrotonic acid, sorbic acid, 3-hexenoic acid, 10-decenoic acid, 2-pentene-1,3,5-tricarboxylic acid, cinnamic acid, and lower alkyl (e.g., $C_1$ to $C_4$ alkyl) acid esters of the foregoing, e.g., methyl maleate, ethyl fumarate, methyl fumarate, etc. Particularly preferred are the unsaturated dicarboxylic acids and their derivatives; especially maleic acid, fumaric acid and maleic anhydride.

Epoxide Reagent

The epoxy derivatives useful in the present process have, in general, at least one point of olefinic unsaturation in its structure. Once the epoxide is grafted onto the polymer backbone, it may be reacted, for example, with amines to form hydroxyl amine. The epoxides may also be reacted with other reagents such as alcohols, mercaptans and carboxylic acids. Suitable epoxides include glycidyl methacrylate, allyl glycidyl ether, 1,2-epoxy-5-hexene and 3,4-epoxy-1-butene.

Graftable Nitrogen and/or Oxygen Monomers

Ethylenically unsaturated monomers which contain one or more of the following: nitrogen and oxygen, are useful for imparting the dispersancy property. Nitrogen and/or oxygen containing monomers suitable for imparting dispersancy, which is associated with sludge and varnish handling, are very broadly, ethylenically unsaturated, aliphatic or aromatic monomers having from 2 to about 50 carbon atoms containing at least one member selected from the group consisting of oxygen, nitrogen, and combinations thereof. Combinations of such ethylenically-unsaturated nitrogen-containing and/or oxygen-containing monomers are also contemplated for use as graftable monomers imparting dispersancy. Specific graftable monomers contemplated for use herein include the following: N-vinylimidazole (also known as 1-vinylimidazole) (VIMA), 1-vinyl-2-pyrrolidinone, C-vinylimidazole, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-5-vinyl thiazole; N-allyl diisooctyl phenothiazine; 2-methyl-1-vinylimidazole, 3-methyl-1-vinylpyrazole, N-vinylpurine, N-vinylpiperazines, vinylpiperidines, vinylmorpholines maleimides, acylamides, such as N,N-dimethyl acrylamide and N,N-dimethyl-aminopropyl acrylamide as well as combinations of these materials or other similar materials. The graftable monomer(s) containing nitrogen, oxygen or both nitrogen and oxygen contemplated for use in the present invention may contain, in addition to nitrogen and/or oxygen, other elements such as sulfur, phosphorus, or the halogens. Specific graftable monomers contemplated for use, include 4-methyl-5-vinyl thiazole and N-allyl diisooctyl phenothiazine.

Amines for Reaction with the Acyl Group or Other Graftable Coupling Agent Group

Amines suitable for imparting soot handling performance are those which are capable of undergoing a condensation reaction with an appropriate acylating agent, namely primary or secondary amines. One or more amines may be used. Amines capable of being acylated are disclosed in U.S. Pat. No. 4,320,019, the disclosure of which is incorporated herein by reference in its entirety, at column 4, line 60 to column 6, line 14; U.S. Pat. No. 5,424,367, the disclosure of which is incorporated herein by reference in its entirety, at column 10, line 61 to column 13, line 18; U.S. Pat. No. 5,427,702, the disclosure of which is incorporated herein by reference in its entirety, at column 13, line 5 to column 17, line 32. Among the various amine types useful in the practice of this invention are alkyl amines, alkylene amines, amines of molecules containing hetero-atoms or heterocycles, alkylene polyamines, aromatic amines, and polyoxyalkylene polyamines.

Some examples of the alkyl amines, alkylene amines, alkylene polyamines and amines of molecules containing heterocycles, include methyleneamines, ethyleneamines, butyleneamines, propyleneamines, pentyleneamines, hexyleneamines, heptyleneamines, octyleneamines, N,N-dimethyaminopropyl amine, N,N-dioctylethyl amine, other polymethyleneamines, the cyclic and higher homologs of these amines such as the piperazines, the amino-alkyl-substituted piperazines, such as (2-aminopropyl)-piperazine; 1,4-bis-(2-aminoethyl)piperazine, and 2-methyl-1-(2-aminobutyl)piperazine, etc. Included are also ethylene diamine, diethylene triamine, triethylene tetramine, propylene diamine, di(heptamethylene)triamine, tripropylene tetramine, tetraethylene pentamine, trimethylene diamine, pentaethylene hexamine, di(trimethylene)triamine, N-octyl-N'-methyethylene diamine, as well as other polyaminic materials. Other higher homologs obtained by condensing two or more of the above-mentioned alkyleneamines may also be used as well as heterocycles such as 3-morpholinopropylamine.

Other amine types useful in the practice of this invention include amino-aromatic compounds such as aryl amines and alkyl aryl amine and the N-arylphenylenediamines. Specific aromatic amines include, for example, aniline, 4-morpholine aniline, benzylamine, phenylethylamine and 3-phenyl-1-propylamine. Among the N-arylphenylenediamines are the N-phenylphenylenediamines. Among these are N-phenyl-1,4-phenylenediamine (also referred to as 4-aminodiphenylamine), N-phenyl-1,3-phenylenediamine, N-phenyl-1,2-phenylenediamine, N-naphthyl-phenylenediamine, N-phenylnaphthalenediamine and N'-aminopropyl-N-phenylphenylenediamine. One of the more preferable amines is 4-aminodiphenylamine (also called N-phenyl-1,4-phenylenediamine). It is also contemplated that combinations of the above amines may be used to react with one or more acylating agents.

Examples of suitable polyoxyalkylene polyamines are those which have the formulae:

where m has a value of about 3 to 70 and preferably 10 to 35; and

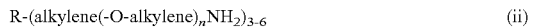

where n has a value of about 1 to 40 with the provision that the sum of all the n's is from about 3 to about 70 and preferably from about 6 to about 35 and R is a polyvalent saturated hydrocarbon radical of up to ten carbon atoms. The alkylene groups in either formula (i) or (ii) may be straight or branched chains containing about 2 to 7, and preferably about 2 to 4 carbon atoms.

The polyoxyalkylene polyamines, such as polyoxyalkylene diamines and polyoxyalkylene triamines, may have average molecular weights ranging from about 200 to about 4000 and preferably from about 400 to about 2000. Suitable polyoxyalkylene polyamines include the polyoxyethylene and polyoxypropylene diamines and the polyoxypropylene triamines having average molecular weights ranging from about 200 to 2000.

Other amine types useful in the practice of this invention include amino-aromatic compounds such as:

N-arylphenylenediamines represented by the formula:

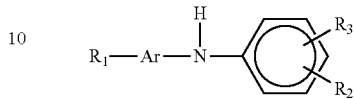

in which Ar is aromatic and $R_1$ is hydrogen, —NH-aryl, —NH-arylalkyl, —NH-alkylaryl, or a branched or straight chain radical having from 4 to 24 carbon atoms and the radical can be an alkyl, alkenyl, alkoxyl, arylalkyl, alkylaryl, hydroxyalkyl or aminoalkyl radical, $R_2$ is —$NH_2$, —(NH$(CH_2)_n$—)$_m$—$NH_2$, $CH_2$—$(CH_2)_n$—$NH_2$, -aryl-$NH_2$, in which n and m each has a value from 1 to 10, and $R_3$ is hydrogen or an alkyl, alkenyl, alkoxyl, arylalkyl, or alkylaryl radical, which may have from 4 to 24 carbon atoms. The N-arylpheylenediamine compounds may also be represented by the formula:

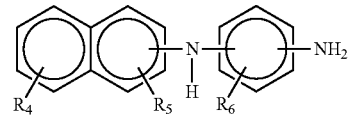

in which $R_4$, $R_5$ and $R_6$ are hydrogen or a linear or branched hydrocarbon radical containing from 1 to 10 carbon atoms and that radical may be an alkyl, alkenyl, alkoxyl, alkylaryl, arylalkyl, hydroxyalkyl, or aminoalkyl radical, and $R_4$, $R_5$ and $R_6$ can be the same or different;

Particularly preferred N-arylphenylenediamines are the N-phenylphenylenediamines, for example, N-phenyl-1,4-phenylenediamine (also referred to herein as 4-aminodiphenylamine), N-phenyl-1,3-phenylenediamine, N-phenyl-1,2-phenylenediamine, N-naphthyl-phenylenediamine, N-phenylnaphthalenediamine and N'-aminopropyl-N-phenylphenylenediamine. Most preferably, the amine is 4-aminodiphenylamine (also called N-phenyl-1,4-phenylenediamine).

Other useful amines are the amino-imidazolines such as 2-heptyl-3-(2-aminopropyl)imidazoline, 4-methylimidazoline and 1,3-bis-(2-aminoethyl)imidazoline, and the aminothiazoles such as aminothiazole, aminobenzothiazole, aminobenzothiadiazole and aminoalkylthiazole.

Other useful amine types include the aminocarbazoles, aminoindoles, amino-indazolinones, aminomercaptotriazole and aminoperimidines.

Structures for these are presented below. The aminocarbazoles are represented by the formula:

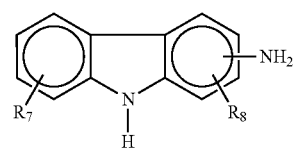

in which $R_7$ and $R_8$ represent hydrogen or an alkyl, alkenyl, or alkoxyl radical having from 1 to 14 carbon atoms, and $R_7$ and $R_8$ can be the same or different;

The aminoindoles are represented by the formula:

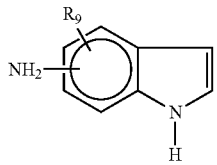

in which $R_9$ represents hydrogen or an alkyl radical having from 1 to 14 carbon atoms, The amino-indazolinones are represented by the formula:

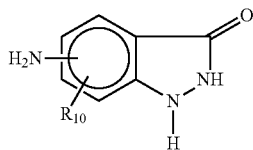

in which $R_{10}$ is hydrogen or an alkyl radical having from 1 to 14 carbon atoms, The aminomercaptotriazole is represented by the formula:

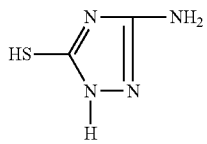

The aminoperimidines are those represented by the formula:

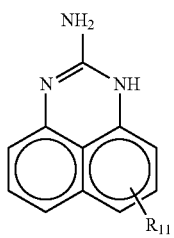

in which $R_{11}$ represents hydrogen or an alkyl or alkoxyl radical having from 1 to 14 carbon atoms.

Other useful amines include: 2-heptyl-3-(2-aminopropyl) imidazoline, 4-methylimidazoline, 1,3-bis-(2-aminoethyl) imidazoline, (2-aminopropyl)-piperazine, 1,4-bis-(2-aminoethyl)piperazine, N,N-dimethyaminopropyl amine, N,N-dioctylethyl amine, N-octyl-N'-methylethylene diamine, and 2-methyl-1-(2-aminobutyl)piperazine, and an aminothiazole from the group consisting of aminothiazole, aminobenzothiazole, aminobenzothiadiazole and aminoalkylthiazole.

It is also contemplated that combinations of the above amines may be used to react with one or more acylating agents.

The choice of amine compound will depend, in part, upon the nature of the acylating agent. In the case of the preferred acylating agent, maleic anhydride, those amines that will react advantageously with the anhydride functionality are preferred. Primary amines are preferred because of the stability of the imide products formed. Primary amines, structurally described as $RNH_2$, may be used in which the R group may contain performance enhancing functionalities desirable for the final product. Such properties may include, among others, wear protection, friction reduction and protection against oxidation. Incorporation of elements in addition to carbon, hydrogen and nitrogen, such as, but not limited to, the halogens or sulfur or oxygen, or phosphorus, either alone or in combination, is also contemplated.

Free-Radical Initiators

Broadly, any free-radical initiator capable of operating under the conditions of the reactions is contemplated for use. Representative initiators are disclosed in U.S. Pat. No. 4,146,489, the disclosure of which is incorporated herein by reference in its entirety, at column 4, lines 45-53. Specific "peroxy" initiators contemplated include alkyl, dialkyl, and aryl peroxides, for example: di-t-butyl peroxide (abbreviated herein as "DTBP"), dicumyl peroxide, t-butyl cumyl peroxide, benzoyl peroxide, 2,5-dimethyl-2,5-di(t-butylperoxy) hexane, and 2,5-dimethyl-2,5-di(t-butylperoxy)hexyne-3. Also contemplated are peroxyester and peroxyketal initiators, for example: t-butylperoxy benzoate, t-amylperoxy benzoate, t-butylperoxy acetate, t-butylperoxy benzoate, di-t-butyl diperoxyphthalate, and t-butylperoxy isobutyrate. Also contemplated are hydroperoxides, for example: cumene hydroperoxide, t-butyl hydroperoxide, and hydrogen peroxide. Also contemplated are azo initiators, for example: 2-t-butylazo-2-cyanopropane, 2-t-butylazo-1-cyanocyclohexane, 2,2'-azobis(2,4-dimethylpentane nitrile), 2,2'-azobis(2-methylpropane nitrile), 1,1'-azobis(cyclohexanecarbonitrile), and azoisobutyronitrile (AIBN). Other similar materials are also contemplated such as, but not limited to, diacyl peroxides, ketone peroxides and peroxydicarbonates. It is also contemplated that combinations of more than one initiator, including combinations of different types of initiators, may be employed.

Solvents

Either polar or non-polar solvents or process fluids may be used. Such solvents facilitate materials handling as well as promoting the uniform distribution of reactants. The process fluids useful here include volatile solvents which are readily removable from the grafted polymer after the reaction is complete. Solvents which may be used are those which can disperse or dissolve the components of the reaction mixture and which will not participate appreciably in the reaction or cause side reactions to a material degree. Several examples of solvents of this type include straight chain or branched aliphatic or alicyclic hydrocarbons, such as n-pentane, n-heptane, i-heptane, n-octane, i-octane, nonane, decane, cyclohexane, dihydronaphthalene, decahydronaphthalene and others. Specific examples of polar solvents include aliphatic ketones (for example, acetone), aromatic ketones, ethers, esters, amides, nitrites, sulfoxides such as dimethyl sulfoxide, water etc. Non-reactive halogenated aromatic hydrocarbons such as chlorobenzene, dichlorobenzene, trichlorobenzene, dichlorotoluene and others are also useful as solvents. Combinations of solvents, of polar and non-polar solvents, are also contemplated for use in the present invention.

The process fluids useful here also include base stocks which have low aromatic content and are suitable for incorporation into a final lubricating oil product. Any base stock may be used which can disperse or dissolve the remaining components of the reaction mixture without materially participating in the reaction or causing side reactions to an unacceptable degree. Hydroisomerized and hydrocracked base stocks, base stocks containing low or moderate levels of aromatic constituents, and fluid poly-α-olefins are contemplated for use herein. Aromatic constituents are desirably kept to low levels since aromatic materials may be reactive with each other or other reaction components in the presence of initiators. The use of base stocks having aromatic constituents, while being less than optimum, is contemplated under this disclosure. These include base stocks containing less than 50% aromatics, alternatively less than 30% aromatics, alternatively less than 25% aromatics, alternatively less than 20% aromatics, alternatively less than 10% aromatics or alternatively less than 5% aromatics.

Suitable base stocks of this kind contemplated include those marketed by ExxonMobil Corp. such as the Group I, 100 SUS, 130 SUS, or 150 SUS low pour solvent neutral base oils, and the Group II EHC base stocks. Representative base stocks include those marketed by PetroCanada, Calgary, Alberta, such as HT 60 (P 60 N), HT 70 (P 70 N), HT 100 (P 100 N), and HT 160 (P 160 N) are also contemplated as well as RLOP stocks such as 100 N and 240 N sold by Chevron USA Products Co., In general, Group I, Group II, Group III, Group IV and Group V base stock categories are contemplated for use. Aromatic-free base stocks such as poly-alpha-olefins ("PAO") may also be used as process fluids.

The aromatic content in the process fluid is preferably from about 0 to about 50 weight percent, alternatively, from about 0 to about 25 weight percent, alternatively, from about 0 to about 15 weight percent, alternatively from about 0 to about 10 weight percent, alternatively from about 0 to about 5 weight percent.

Reaction Conditions

To prepare a multi-function graft polymer which displays both good soot handling and sludge and varnish control, the respective monomer species which impart these performance characteristics are grafted onto the same polymer backbone. The graft sequence is important as graft order is a determinant of performance quality. To achieve good performance with respect to both soot handling and sludge and varnish control an acylating agent, such as maleic anhydride, is grafted onto the polymer forming an acylated hydrocarbon, for example, a polymer containing succinic anhydride (SA) groups. Next, the monomer or monomer grouping associated with sludge and varnish handling, e.g., N-vinylimidazole (VIMA), is introduced and grafted onto the polymer backbone. Finally, the amine reactant or reactants capable of undergoing a condensation reaction with the acyl group, for example, a succinic anhydride group, is introduced and reacted with the acyl group, e.g. the succinic anhydride group, thereby forming, an amide, imide, or amic acid, depending on the reactants. Hence, the reactants comprise a polymer, a graftable acylating agent, an amine capable of undergoing reaction with an acylating agent, a graftable amine and a free-radical initiator to promote the grafting reactions. More than one type of reactant may be used so the reactants may comprise one or more graftable polymers, selected from polyolefins and polyesters, one or more graftable acylating agents, one or more amines capable of undergoing reaction with an acylating agent, one or more graftable amines, and one or more free-radical initiators to promote the grafting reactions.

The multi-functional graft polymer of the present invention may be prepared in solution or by melt blending, or by a combination of melt blending and reaction in solution. In general, grafting reactions will be conducted at a temperature sufficient to graft a least a portion of the monomer to the polymer.

In general, preparation of the multi-functional graft polymer in solution is carried out as follows. The polymer to be grafted is provided in fluid form. For example, the polymer may be dissolved in a solvent, which may be a hydrocarbon base oil suitable for use in a lubricating composition or any other suitable solvent. The polymer solution is then heated to an appropriate reaction temperature. A graftable acylating agent is then introduced and grafted onto the polymer using an initiator such as a peroxide molecule, thereby forming an acylated polymer, for example, when the acylating agent is maleic anhydride, a polymer having succinic anhydride groups is formed. Subsequent to this reaction, a graftable monomer, which may contain nitrogen, oxygen, or both nitrogen and oxygen, is introduced and grafted onto the polymer backbone using an appropriate initiator. The final step in the preparation of the graft polymer is reaction of the acylated polymer, for example a polymer having succinic anhydride groups, with either a primary or secondary amine. It should be noted that, in general, the reaction temperature will be maintained constant throughout the entire sequence of processes required for the preparation of the graft polymer.

More particularly, the polymer solution is placed into a suitable reactor such as a resin kettle and the solution is heated, under inert blanketing, to the desired reaction temperature, and the reaction is carried out under an inert blanket. At a minimum, the reaction temperature should be sufficient to consume essentially all of the selected initiator during the time allotted for the reaction. For example, if di-t-butyl peroxide (DTBP) is used as the initiator the reaction temperature should range from about 145° C. to about 220° C., alternatively from about 155° C. to about 210° C., alternatively from about 160° C. to about 200° C., alternatively from about 165° C. to about 190° C., alternatively from about 165° C. to about 180° C. or about 170° C., alternatively greater than about 170° C., alternatively greater than about 175° C. Different initiators work at different rates for a given reaction temperature. Therefore, the choice of a particular initiator may require adjustment of reaction temperature or time. It should be noted that once a temperature is adopted, the temperature, in general, will be maintained constant throughout the entire sequence of processes required in the preparation of the graft polymer.

Grafting of the Acylating Agent

The acylating agent is added to the polymer solution and dissolved. The contemplated proportions of the acylating agent to polymer are selected so that an effective percentage will graft directly onto the polymer backbone. The minimum mole ratio of acylating agent to polymer is as follows:

at least about 1 mole,
    alternatively at least about 2 moles,
    alternatively at least about 3 moles,
    alternatively at least about 4 moles,
    alternatively at least about 5 moles,
    alternatively at least about 6 moles,
    alternatively at least about 7 moles,
    alternatively at least about 8 moles,
    alternatively at least about 9 moles,
    alternatively at least about 10 moles,
    alternatively at least about 11 moles,
    alternatively at least about 12 moles,
    alternatively at least about 13 moles,
    alternatively at least about 14 moles,
    alternatively at least about 15 moles, alternatively at least about 20 moles,
alternatively at least about 25 moles,
alternatively at least about 30 moles,
alternatively at least about 40 moles,
alternatively at least about 50 moles,
alternatively at least about 60 moles,
alternatively at least about 70 moles,
alternatively at least about 74 moles,
of the graftable acylating agent per mole of the starting polymer. The contemplated maximum molar proportion of the graftable acylating agent to the starting polymer is as follows:
at most about 10 moles,
alternatively at most about 12 moles,
alternatively at most about 15 moles,
alternatively at most about 20 moles,
alternatively at most about 22 moles,
alternatively at most about 24 moles,
alternatively at most about 25 moles,
alternatively at most about 26 moles,
alternatively at most about 28 moles,
alternatively at most about 30 moles,
alternatively at most about 40 moles,
alternatively at most about 50 moles,
alternatively at most about 60 moles,
alternatively at most about 74 moles,
of the graftable acylating agent per mole of the starting polymer.

The graftable acylating agent may be introduced into the reactor all at once, in several discrete charges, or at a steady rate over an extended period. The desired minimum rate of addition of the graftable acylating agent to the reaction mixture is selected from:
at least about 0.01%,
alternatively at least about 0.05%,
alternatively at least about 0.1%,
alternatively at least about 0.5%,
alternatively at least about 1%,
alternatively at least about 2%,
alternatively at least about 3%,
alternatively at least about 4%,
alternatively at least about 5%,
alternatively at least about 10%,
alternatively at least about 20%,
alternatively at least about 50%,
alternatively at least about 100%,
of the necessary charge of graftable acylating agent per minute. Any of the above values can represent an average rate of addition or the minimum rate of addition. When added over time, the graftable acylating agent can be added as discrete charges, at an essentially constant rate or at a rate which varies with time.

The desired maximum rate of addition is selected from:
at most about 1%,
alternatively at most about 2%,
alternatively at most about 5%,
alternatively at most about 10%,
alternatively at most about 20%,
alternatively at most about 50%,
alternatively at most about 100%
of the necessary charge of graftable acylating agent per minute. Any of the above values can represent an average rate of addition or the maximum rate of addition.

The graftable acylating agent may be added as a neat liquid, in solid or molten form, or cut back with a solvent. While it may be introduced neat, it is preferably cut back with a solvent to avoid localized concentrations of the monomer as it enters the reactor. In a preferred embodiment, it is substantially diluted with the process fluid (reaction solvent). The monomer can be diluted by at least about 5 times, alternatively at least about 10 times, alternatively at least about 20 times, alternatively at least about 50 times, alternatively at least about 100 times its weight or volume with a suitable solvent or dispersing medium.

An initiator is added to the solution comprised of polymer and acylating agent. The initiator can be added before, with or after the graftable acylating agent. When adding the initiator, it may be added all at once, in several discrete charges, or at a steady rate over an extended period. For example, the initiator may be added so that, at any given time, the amount of unreacted initiator present is much less than the entire charge or, preferably, only a small fraction of the entire charge. In one embodiment, the initiator may be added after substantially, most or the entire graftable acylating agent has been added, so there is an excess of both the graftable acylating agent and the polymer during essentially the entire reaction. In another embodiment, the initiator may be added along with, or simultaneously with, the graftable acylating agent, either at essentially the same rate (measured as a percentage of the entire charge added per minute) or at a somewhat faster or slower rate, so there is an excess of polymer to unreacted initiator and unreacted acylating agent. For this embodiment, the ratio of unreacted initiator to unreacted acylating agent remains substantially constant during most of the reaction.

The contemplated proportions of the initiator to the graftable acylating agent and the reaction conditions are selected so that most, and ideally, all of the graftable acylating agent will graft directly onto the polymer, rather than forming dimeric, oligomeric, or homopolymeric graft moieties or entirely independent homopolymers. The contemplated minimum molar proportions of the initiator to the graftable acylating agent are from about 0.02:1 to about 2:1, alternatively from about 0.05:1 to about 2:1. No specific maximum proportion of the initiator is contemplated, though too much of the initiator may degrade the polymer, cause problems in the finished formulation and increase cost and, therefore, should be avoided.

The desired minimum rate of addition of the initiator to the reaction mixture is selected from:
at least about 0.005%
alternatively at least about 0.01%,
alternatively at least about 0.1%,
alternatively at least about 0.5%,
alternatively at least about 1%,
alternatively at least about 2%,
alternatively at least about 3%,
alternatively at least about 4%,
alternatively at least about 5%,
alternatively at least about 20%
alternatively at least about 50%,
of the necessary charge of initiator per minute. Any of the above values can represent an average rate of addition or the minimum rate of addition. When the initiator is added over time, the initiator can be added as discrete charges, at an essentially constant rate or at a rate which varies with time.

The desired maximum rate of addition of the initiator to the reaction mixture is selected from:
at most about 0.5%,
alternatively at most about 1%,
alternatively at most about 2%,
alternatively at most about 3%,
alternatively at most about 4%,
alternatively at most about 5%, alternatively at most about 10%,
alternatively at most about 20%,
alternatively at most about 50%
alternatively at most about 100%,
of the necessary charge of initiator per minute. Any of the above values can represent an average rate of addition or the maximum rate of addition.

While the initiator can be added neat, it is preferably cut back with a solvent to avoid high localized concentrations of the initiator as it enters the reactor. In a preferred embodiment, it is substantially diluted with the process fluid (reaction solvent). The initiator can be diluted by at least about 5 times, alternatively at least about 10 times, alternatively at least about 20 times, alternatively at least about 50 times, alternatively at least about 100 times its weight or volume with a suitable solvent or dispersing medium.

Grafting of the Sludge and Varnish Control Substituent (Grafting of the Nitrogen and/or Oxygen Monomer)

As noted above, the temperature, in general, will remain constant throughout preparation of the graft polymer. Hence, while at temperature, one or more monomers associated with sludge and varnish handling, e.g., VIMA, is introduced along with an initiator. The contemplated proportions of the monomer to polymer are selected so that an effective percentage will graft directly onto the polymer backbone. The monomer may be added as several discreet charges, at an essentially constant rate, at a rate which varies with time, or all at once. The minimum mole ratio of monomer to polymer is:

at least about 1 mole,
alternatively at least about 2 moles,
alternatively at least about 3 moles,
alternatively at least about 4 moles,
alternatively at least about 5 moles,
alternatively at least about 6 moles,
alternatively at least about 7 moles,
alternatively at least about 8 moles,
alternatively at least about 9 moles,
alternatively at least about 10 moles,
alternatively at least about 11 moles,
alternatively at least about 12 moles,
alternatively at least about 13 moles,
alternatively at least about 14 moles,
alternatively at least about 15 moles,
alternatively at least about 20 moles,
alternatively at least about 25 moles,
alternatively at least about 30 moles,
alternatively at least about 40 moles,
alternatively at least about 50 moles,
alternatively at least about 60 moles,
alternatively at least about 70 moles,
alternatively at least about 74 moles,
of the graftable monomer per mole of the starting polymer. The contemplated maximum molar proportion of the graftable monomer to the starting polymer is as follows:

at most about 10 moles,
alternatively at most about 12 moles,
alternatively at most about 15 moles,
alternatively at most about 20 moles,
alternatively at most about 22 moles,
alternatively at most about 24 moles,
alternatively at most about 25 moles,
alternatively at most about 26 moles,
alternatively at most about 28 moles,
alternatively at most about 30 moles,
alternatively at most about 40 moles,
alternatively at most about 50 moles,
alternatively at most about 60 moles,
alternatively at most about 74 moles,
of the graftable monomer per mole of the starting polymer.

The graftable monomer may be introduced into the reactor as several discrete charges, at an essentially constant rate, at a rate which varies with time, or all at once. The desired minimum rate of addition of the graftable monomer to the reaction mixture is selected from:

at least about 0.1%,
alternatively at least about 0.5%,
alternatively at least about 1%,
alternatively at least about 2%,
alternatively at least about 3%,
alternatively at least about 4%,
alternatively at least about 5%,
alternatively at least about 10%,
alternatively at least about 20%,
alternatively at least about 50%,
alternatively at least about 100%,
of the necessary charge of graftable monomer per minute. When added over time, the monomer can be added at an essentially constant rate, or at a rate which varies with time. Any of the above values can represent an average rate of addition or the minimum value of a rate which varies with time. The desired maximum rate of addition is selected from:

alternatively at most about 1%,
alternatively at most about 2%,
alternatively at most about 5%,
alternatively at most about 10%,
alternatively at most about 20%,
alternatively at most about 50%,
alternatively at most about 100%
of the necessary charge of graftable monomer per minute. Any of the above values can represent an average rate of addition or the maximum value of a rate which varies with time.

The graftable monomer may be added as a neat liquid, in solid or molten form, or cut back with a solvent. While it may be introduced neat, it is preferably cut back with a solvent to avoid localized concentrations of the monomer as it enters the reactor. In a preferred embodiment, it is substantially diluted with the process fluid (reaction solvent). The monomer can be diluted by at least about 5 times, alternatively at least about 10 times, alternatively at least about 20 times, alternatively at least about 50 times, alternatively at least about 100 times its weight or volume with a suitable solvent or dispersing medium.

The initiator can be added before, with or after the graftable monomer. It may be added into the reactor all at once, in several (or, alternatively, many) discrete charges, or at a steady rate over an extended period. For example, the initiator may be added so that, at any given time, the amount of unreacted initiator present is much less than the entire charge or, preferably, only a small fraction of the entire charge. In one embodiment, the initiator may be added after substantially most or all of the monomer has been added, so there is an excess of both the monomer and the polymer during essentially the entire reaction. In another embodiment, the initiator may be added along with the monomer, either at essentially the same rate (measured as a percentage of the entire charge added per minute) or at a somewhat faster or slower rate, so there is an excess of polymer to unreacted initiator and unreacted monomer. Using this reactant feed scheme, the ratio of unreacted initiator to unreacted monomer remains substantially constant during most of the reaction.

The contemplated proportions of the initiator to the monomer and the reaction conditions are selected so that most, and ideally, all of the monomer will graft directly onto the polymer, rather than forming dimeric, oligomeric, or homopolymeric graft moieties or entirely independent homopolymers. The contemplated minimum molar proportions of the initiator to the monomer agent are from about 0.02:1 to about 2:1, alternatively from about 0.05:1 to about 2:1. No specific maximum proportion of the initiator is contemplated, though too much of the initiator may degrade the polymer, cause problems in the finished formulation and increase cost and, therefore, should be avoided.

The initiator may be introduced into the reactor in several (or, alternatively, many) discrete charges, or at a steady rate over an extended period. The desired minimum rate of addition of the initiator to the reaction mixture is selected from:
  at least about 0.1%,
  alternatively at least about 0.5%,
  alternatively at least about 1%,
  alternatively at least about 2%,
  alternatively at least about 3%,
  alternatively at least about 4%,
  alternatively at least about 5%,
  alternatively at least about 20%
  alternatively at least about 50%,
of the necessary charge of initiator per minute. The initiator can be added at an essentially constant rate, or at a rate which varies with time. Any of the above values can represent an average rate of addition or the minimum value of a rate which varies with time.

The desired maximum rate of addition of the initiator to the reaction mixture is selected from:
  at most about 0.5%,
  alternatively at most about 1%,
  alternatively at most about 2%,
  alternatively at most about 3%,
  alternatively at most about 4%,
  alternatively at most about 5%,
  alternatively at most about 10%,
  alternatively at most about 20%,
  alternatively at most about 50%
  alternatively at most about 100%,
of the necessary charge of initiator per minute. Any of the above values can represent an average rate of addition or the maximum value of a rate which varies with time.

While the initiator can be added neat, it is preferably cut back with a solvent to avoid localized concentrations of the initiator as it enters the reactor. In a preferred embodiment, it is substantially diluted with the process fluid (reaction solvent). The initiator can be diluted by at least about 5 times, alternatively at least about 10 times, alternatively at least about 20 times, alternatively at least about 50 times, alternatively at least about 100 times its weight or volume with a suitable solvent or dispersing medium. The reaction is allowed to proceed to the extent required by the particular reactants.

Formation of the Soot Handling Substituent

The next step in the preparation of the graft polymer is the conversion of the acylated polymer, e.g., the polymer having the succinic anhydride substituent into the soot handling moiety via a condensation reaction with the amine reactant or reactants. The solution may be maintained either at an elevated temperature, such as the temperature appropriate for carrying out the grafting reaction, or the temperature may be decreased to, perhaps, room temperature. If the reactor temperature is decreased, the amine reactant may be introduced into the reactor all at once and blended into the polymer solution. The reactor temperature is then raised to carry out the reaction between the acylated polymer and the amine reactant. Alternatively, the reactor may be maintained at an elevated temperature. The amine reactant is then fed to the reactor relatively slowly allowing for the reaction between the acylated polymer and the amine reactant. The reactants are maintained at temperature until the reaction with the amine is complete. The inert blanket may be maintained during this stage of preparation of the graft polymer.

The contemplated proportions of the amine reactant to polymer are selected so that an effective percentage will react with the acyl group, e.g., a succinic anhydride group. The minimum mole ratios of amine reactant to the acyl group, e.g., succinic anhydride group, are as follows: from about 0.1:1 to about 6:1, from about 0.2:1 to about 6:1, from about 0.3:1 to about 4:1, or from about 0.6:1 to about 4:1. The preferred molar ratios are in the range of from about 0.6:1 to about 2:1.

The amine reactant may be introduced into the reactor in several (or, alternatively, many) discrete charges, or at a steady rate over an extended period, or at a rate which varies with time, or all at once. That is, the rate of addition of amine reactant is as follows:
  at least about 0.2%,
  alternatively at least about 0.5%,
  alternatively at least about 1%,
  alternatively at least about 2%,
  alternatively at least about 3%,
  alternatively at least about 4%,
  alternatively at least about 5%,
  alternatively at least about 20%
  alternatively at least about 50%,
  alternatively at least about 100%,
of the necessary charge of amine reactant per minute. Any of the above values can represent an average rate of addition or the minimum value of a rate which varies with time.

After the reaction has gone essentially to completion, the heat may be removed and the reaction product allowed to cool in the reactor with mixing or removed prior to cooling. It is contemplated that the operative range for the total concentration of graft monomers is from about 2 moles graft monomer per mole of polymer, comprised of sludge and varnish handling monomer and of soot controlling monomer, to about 75 moles graft monomer per mole of polymer, comprised also of sludge and varnish handling monomer and soot controlling monomer. The range for each of the graft monomers, when considered separately, is from about 1 mole graft monomer per mole of polymer to about 74 moles graft monomer per mole of polymer. In one embodiment, the multi-functional graft polymer has about 7 moles soot controlling monomer per mole of polymer and about 7 moles sludge and varnish controlling monomer per mole of polymer.

Melt Reaction Conditions for Preparation of Graft Polymer

The grafting reaction can be carried out under polymer melt reaction conditions in an extrusion reactor, a heated melt-blend reactor, a Banbury mill or other high-viscosity material blenders or mixers, for example, an extruder. (The term extruder used in this specification should be understood as being exemplary of the broader class of blenders or mixers which may be used for melt-blending according to the present invention.)

To carry out the melt reaction, it is desirable to establish suitable process design parameters for the reactive extruder to insure that the unit is capable of achieving the operating parameters and conditions needed in order to generate the desired product or products. The operating conditions and parameters appropriate for carrying out reactive extrusion include, but are not limited to, criteria for the reactant addition ports, the reactant feed systems which include feed rate controllers and monitors, the polymer feed hopper, the polymer handling and feed system which includes feed rate controllers and monitors, the extruder design which includes, among others, the screw design and its size, barrel diameter and length, die configuration and open cross-section, systems for heating the extruder and controlling extruder temperature, such as, barrel temperature and die temperature, screw speed, and both pre-extrusion and post-extrusion conditions. The precise conditions are established by those skilled in the art to meet the product targets. It should be noted that during its operation, the extruder can be maintained under, essentially, aerobic conditions, or may be purged or blanketed with an inerting material to create anaerobic operating conditions.

The appropriate reactant feed concentrations and conditions may be based upon the teachings presented in the present specification for the solvent based grafting reaction. These include the appropriate feed rates, concentrations and conditions of the polymer or polymers, the graftable nitrogen monomer or monomers, the acylating agent or agents, the initiator or initiators and the amine reactant or reactants. Examples of the concentrations and conditions referred to include, among others, the relative concentrations of the graftable nitrogen monomer and of the acylating agent to both the polymer and the initiator and of the relative concentration of amine reactant to acylating agent.

The contemplated minimum and maximum molar proportions are, in general, the same as those previously identified for the solvent based reactions. As had been outlined for the solvent based reactions, the reactants may be fed to the extruder, alternatively, as a mixture of components or separately, as individual components.

While the reactants may be added neat, in preferred embodiments, many are introduced "cut-back" or diluted with solvent in order to avoid localized regions of elevated species concentration. Representative solvents include base oils conventionally used in lubricant compositions, as defined in this specification, mineral spirits, volatile, as well as non-volatile, solvents, polar solvents and other solvents known to those skilled in the art. The concentration of reagent, relative to solvent may range from about 1 wt % to about 99 wt %. In general, the concentrations and conditions for carrying out the grafting reaction via reactive extrusion are chosen in order to promote grafting of the reactive reagents directly onto the polymer, as compared with these reagents reacting to form dimeric, oligomeric, or homopolymeric graft moieties or, even, independent homopolymers. In a preferred embodiment, the reactants are introduced "cut-back" with solvent, as noted, in order to avoid localized regions of elevated concentration.

In carrying out the graft reaction, the polymer, essentially as a solid, is fed to the extruder at a constant rate and brought to its melt condition. The graftable acylating agent, nitrogen monomer and initiator are metered into the extruder at a constant rate. This may be done either through the same feed port as that of the polymer or through specific reactant feed ports. That is, the graftable reactants and initiator may be fed, essentially together with the polymer into the same extruder zone, or alternatively, delivery of the graftable reagents and initiator may be somewhat delayed, by being introduced downstream from the polymer into a zone separated from the polymer feed hopper by appropriate screw seal elements.

With respect to the initiator, it may be introduced, either before, together with, or after the respective graftable reagents, namely, either into the same extruder zone or into different zones established by appropriate seal elements. These screw elements may be located either in front of or after the respective zones into which each of the graftable reagents are fed. The feed rates of graftable reagents, namely, the acylating agents and nitrogen monomers and of initiator and their concentrations relative to polymer are adjusted to yield the desired product composition. In addition to the graftable reagents, an amine capable of reacting with the acylating agent may be fed to the extruder, downstream from the grafted polymer to complete the preparation of the multi-function dispersant graft polymer.

In one embodiment, only one graftable reagent, either the acylating agent or the nitrogen monomer, may be grafted onto the polymer via extrusion while the other reagent may be grafted via the solution process. In a preferred embodiment, the acylating reagent is grafted onto the polymer via an extrusion process, while the nitrogen monomer and the amine capable of undergoing a condensation reaction with the acylating agent are introduced via solution processes.

One or more polymers, acylating agents, graftable nitrogen monomers, initiators and amines may be used to produce the multifunctional graft polymer of the present invention. In a preferred embodiment, one polymer, one acylating agent one graftable nitrogen monomer, one or more initiators and one amine may be used for grafting. In alternate embodiments, more than one polymer, more than one acylating agent more than one graftable nitrogen monomer, more than one initiator and more than one amine may be used for grafting.

In alternate embodiments of this invention, as explained above, the monomer and initiator can be introduced together at the appropriate relative concentration. By carefully selecting the operating conditions, in terms of residence times, extruder zone temperatures, screw speed, reactant feed rates, etc., the extruder process may be customized for various polymers disclosed herein, any of the graftable monomers disclosed herein, the initiators disclosed herein, and, if required, inhibitors, to yield product having a wide range of monomer to polymer ratios or other specifically desired properties.

The melt reaction product may be used either neat, as a "solid" or dissolved in an appropriate solvent. In a preferred embodiment, the grafted polymer product is dissolved in an appropriate solvent of base stock in order to facilitate handling of the graft polymer and to facilitate lubricant blending using the graft product.

In a preferred embodiment, the reactants, for example, the acylating agent or acylating agents, the nitrogen monomer or the nitrogen monomers, the initiator or initiators and the amine or amines for the condensation reaction, are fed separately. It is also preferred that the polymer be the first reactant which is fed to the extruder.

Performance Test Methods

The 24-Hour ADT Test

The 24-Hour ADT test, used to evaluate the dispersancy of grafted dispersant polymers, is described in U.S. Pat. No. 4,146,489, the disclosure of which is incorporated herein by reference in its entirety.

The ADT test is carried out as follows: A sample of the grafted polymer is dissolved in Exxon 150N base oil to give a solution containing 0.25% weight of polymer solids. Separately, 10 ml of base oil is put into each of a series of six test tubes in a test tube rack. 10 ml of the grafted dispersant polymer solution is then added to the base oil in the first test tube in the series. The base oil and grafted dispersant polymer solution in the first test tube are mixed until homogeneous, giving a solution which contains one half of the concentration of grafted dispersant polymer contained in the original solution. From this first tube, 10 ml are decanted and poured into the second tube. The contents of the second tube are further diluted by a factor of 2. This process of sequential dilution is continued through the series of tubes, successively producing solutions with ¼, ⅛, 1/16, and 1/32 of the concentration of grafted dispersant polymer contained in the first tube.

A standardized quantity of sludge solution intended to simulate the sludge in the crankcase of an internal combustion engine, is introduced and mixed well in each of the above prepared solutions. The tubes are allowed to stand at room temperature for 24 hours (or, in some cases, for a shorter or longer period, as indicated in the test results). The tubes of each set are examined in front of a light source to determine which tube is the first in the series to exhibit sediment (fallout), this being associated with sludge which is not successfully dispersed. The ADT result is graded as follows:

| Number of Tubes with no sediment | First fallout present in tube number | Reported ADT Result |
| --- | --- | --- |
| 0 | 1 | FAIL |
| 1 | 2 | 1 |
| 2 | 3 | 2 |
| 3 | 4 | 4 |
| 4 | 5 | 8 |
| 5 | 6 | 16 |
| 6 | — | 32 |

The ADT result is reported to the nearest power of two because the concentration of the grafted dispersant polymer solution is halved in each successive tube.

Rapid ADT Procedure

A modification of the above noted 24-Hour ADT test is the Rapid ADT test, a test method developed by Castrol Limited and described in U.S. Pat. No. 6,410,652 B1, the disclosure of which is incorporated herein by reference in its entirety. The Rapid ADT test, giving the same results as the above noted ADT test, is an accelerated version of the above noted ADT test. Sample preparation for the Rapid ADT test is the same as that described for the 24-hour test except that the test tubes are placed in a 60° C. oven for only 90 minutes. The tubes are graded in the same manner as for the 24-Hour ADT to determine the Rapid ADT result for the grafted dispersant polymer solution. After this accelerated test, the tubes can be maintained for an additional 24 and 48 hours at room temperature in order to assess potential long-term effects.

The multifunctional graft polymers of the present invention will generally have a Rapid ADT response of at least about 1, alternatively, at least about 2, alternatively, at least about 4, alternatively, at least about 6, alternatively, at least about 8, alternatively, at least about 10, alternatively, at least about 12, alternatively, at least about 14, alternatively, at least about 16, alternatively, at least about 18, alternatively, at least about 20, alternatively, at least about 22, alternatively, at least about 24, alternatively, at least about 26, alternatively, at least about 28, alternatively, at least about 30, alternatively, at least about 32. The Rapid ADT response for multifunctional graft polymers of the present invention will generally range from about 1 to about 32, alternatively from about 2 to about 16, alternatively from about 4 to about 8.

Peugeot XUD Screener Engine Test

The diesel performance of the dual-monomer graft polymer of the present invention was evaluated using the Peugeot XUD 11 Screener Engine Test, a test designed to evaluate the influence of combustion soot on engine oil performance at medium temperatures with emphasis upon soot induced engine oil viscosity increase. It is carried out using a Peugeot XUD11 BTE 2.1 liter, inline, four-cylinder turbocharged automotive diesel engine. The engine test is run for approximately 20-25 hours with oil additions made and oil samples collected approximately every 5 hours. The following parameters are measured: soot loading (or soot suspended) in the oil at the end of the test, viscosity increase at 100° C. at the end of test and the extrapolated viscosity increase at 100° C. at a soot loading of 3%. Relative improvement in performance is indicated by a relative increase in the percentage of soot in the oil and by relative decreases in both the end of test viscosity and the viscosity increase extrapolated to 3% soot.

Sequence VG Engine Test

To confirm that the dual-monomer graft polymer of the present invention is capable of controlling sludge and varnish, blended oils were tested using the Sequence VG Engine Test. This engine test is designed to evaluate how well an engine oil inhibits sludge and varnish formation. The test is carried out using a Ford 4.6 liter, spark ignition, four stroke, eight-cylinder V-configuration engine. The test is carried out for a total of 216 hours. The test procedure calls for oil leveling and sampling every 24 hours. At the end of the test, the engine parts are rated, with respect to engine cleanliness, in terms of sludge and varnish.

Lubricating Oil Compositions

The lubricating oil compositions of the present invention preferably comprise the following ingredients in the stated proportions:

A. from about 60% to about 99% by weight, alternatively from about 65% to about 99% by weight, alternatively from about 70% to about 99% by weight, of one or more base oils (including base oil carried over from the making of the grafted polymer);

B. from about 0.02% solids to about 10% solids by weight, alternatively from about 0.05% solids to about 10% solids by weight, alternatively from about 0.05% solids to about 5% solids by weight, alternatively from about 0.15% solids to about 2.5% solids by weight, alternatively from about 0.15% solids to about 2% solids by weight, alternatively from 0.25% solids to about 2% solids by weight, alternatively from 0.3% solids by weight to 1.5% solids by weight, of one or more of the grafted polymers made according to this specification (i.e., not including base oil carried over from the making of the grafted polymer);

C. from about 0.0% solids to 2.0% solids by weight, alternatively from about 0.0% solids to about 1.0% solids by weight, alternatively from about 0.05% solids to about 0.7% solids by weight, alternatively from about 0.1% solids to about 0.7% solids by weight, of one or more polymers other than the grafted polymers according to the present invention;

D. from 0.0% to about 15% by weight, alternatively from about 0.2% to about 10% by weight, alternatively from about 0.5% to about 8% by weight, or alternatively from about 0.7% to about 6%, of one or more dispersants which are not grafted polymers according to the present invention;

E. from about 0.3% to 10% by weight, alternatively from about 0.3% to 8% by weight, alternatively from about 0.5% to about 6% by weight, alternatively from about 0.5 to about 4% by weight, of one or more detergents;

F. from about 0.01% to 5% by weight, alternatively from about 0.04% to about 3% by weight, alternatively from about 0.06% to about 2% by weight, of one or more anti-wear agents;

G. from about 0.01% to 5% by weight, alternatively from about 0.01% to 3% by weight, alternatively from about 0.05% to about 2.5% by weight, alternatively from about 0.1% to about 2% by weight, of one or more anti-oxidants; and H. from about 0.0% to 4% by weight, alternatively from about 0.0% to 3% by weight, alternatively from about 0.005% to about 2% by weight, alternatively from about 0.005% to about 1.5% by weight, of minor ingredients such as, but not limited to, friction modifiers, pour point depressants, and anti-foam agents.

The percentages of D through H may be calculated based on the form in which they are commercially available. The function and properties of each ingredient identified above and several examples of ingredients are summarized in the following sections of this specification.

Base Oils

Any of the petroleum or synthetic base oils previously identified as process solvents for the graftable polymers of the present invention can be used as the base oil. Indeed, any conventional lubricating oil, or combinations thereof, may also be used.

Composition of Multiple Function Grafted Polymers

The multiple function grafted polymers according to the present invention contain from about 1 mole to about 74 moles of each graftable monomer per mole of original polymer with a composite total of 75 moles of monomer. In one embodiment the grafted polymers of the present invention contain about 7 moles soot controlling monomer per mole of polymer and about 7 moles sludge and varnish controlling monomer per mole of original polymer.

The multiple function grafted polymers can be used in place of part, or all, of the viscosity index improving polymers conventionally used in such formulations. They can also be used in place of part or all of the agents used to control soot, sludge and varnish that are conventionally used in such formulations, as they possess soot handling and dispersancy properties.

Grafted polyolefins and/or polyesters disclosed in prior art can also be used in combination with the grafted polyolefins and/or polyesters disclosed in the present invention.

Non-Grafted Polymers

The conventional viscosity index improving polyolefins can be used in the formulations according to the present invention. These are conventionally long-chain polyolefins. Several examples of polymers contemplated for use herein include those suggested by U.S. Pat. No. 4,092,255, the disclosure of which is incorporated herein by reference in its entirety, at column 1, lines 29-32: polyisobutenes, polymethacrylates, polyalkylstyrenes, partially hydrogenated copolymers of butadiene and styrene, amorphous polyolefins of ethylene and propylene, ethylene-propylene diene polymers, polyisoprene, and styrene-isoprene.

Dispersants

Dispersants help suspend insoluble engine oil oxidation products, thus preventing sludge flocculation and precipitation or deposition of particulates on metal parts. Suitable dispersants include alkyl succinimides such as the reaction products of oil-soluble polyisobutylene succinic anhydride with ethylene amines such as tetraethylene pentamine and borated salts thereof.

Such conventional dispersants are contemplated for use herein. Several examples of dispersants include those listed in U.S. Pat. No. 4,092,255 at column 1, lines 38-41: succinimides or succinic esters, alkylated with a polyolefin of isobutene or propylene, on the carbon in the alpha position of the succinimide carbonyl. These additives are useful for maintaining the cleanliness of an engine or other machinery.

Detergents

Detergents to maintain engine cleanliness can be used in the present lubricating oil compositions. These materials include the metal salts of sulfonic acids, alkyl phenols, sulfurized alkyl phenols, alkyl salicylates, naphthenates, and other soluble mono- and dicarboxylic acids. Basic (vis, overbased) metal salts, such as basic alkaline earth metal sulfonates (especially calcium and magnesium salts) are frequently used as detergents. Such detergents are particularly useful for keeping the insoluble particulate materials in an engine or other machinery in suspension. Other examples of detergents contemplated for use herein include those recited in U.S. Pat. No. 4,092,255, at column 1, lines 35-36: sulfonates, phenates, or organic phosphates of polyvalent metals.

Anti-Wear Agents

Anti-wear agents, as their name implies, reduce wear of metal parts. Zinc dialkyldithiophosphates and zinc diaryldithiophosphates and organo molybdenum compounds such as molybdenum dialkyldithiocarbamates are representative of conventional anti-wear agents.

Anti-Oxidants

Oxidation inhibitors, or anti-oxidants, reduce the tendency of lubricating oils to deteriorate in service. This deterioration can be evidenced by increased oil viscosity and by the products of oxidation such as sludge and varnish-like deposits on the metal surfaces. Such oxidation inhibitors include alkaline earth metal salts of alkylphenolthioesters having preferably $C_5$ to $C_{12}$ alkyl side chains, e.g., calcium nonylphenol sulfide, dioctylphenylamine, phenyl-alpha-naphthylamine, phosphosulfurized or sulfurized hydrocarbons, and organo molybdenum compounds such as molybdenum dialkyldithiocarbamates. Use of conventional antioxidants may be reduced or eliminated by the use of the multiple function grafted polymer of the present invention.

Minor Ingredients

Many minor ingredients which do not prevent the use of the present compositions as lubricating oils are contemplated herein. A non-exhaustive list of other such additives includes pour point depressants, rust inhibitors, as well as extreme pressure additives, friction modifiers, seal swell agents, antifoam additives, and dyes.

EXAMPLES

Example 1 of Graft Polymer Preparation

A 500 ml resin kettle equipped with an electric heating mantle, stirrer, thermometer, metering syringe pump feed system and a gas inlet was charged with 400 grams of a 12.5% by weight ethylene-propylene polymer solution. The solution was prepared by dissolving about 50 gms of the polymer, Polimeri Europa CO-043 (Polimeri Europa, Ferrara, Italy) in 350 gms of a commercially available hydrorefined base stock, ExxonMobil EHC-60 (ExxonMobil, Fairfax, Va. 22037).

The gas inlet permits the gas to be fed either below or above the surface of the solution. The solution was heated to 170° C. and maintained at temperature throughout the preparation. During heating, the polymer solution was purged with an inerting gas ($CO_2$) fed below the surface of the solution. When the solution reached the temperature of 170° C., the purge gas was redirected to flow over the surface of the polymer solution. The flow of the blanketing gas was maintained throughout the preparation of the graft polymer.

A single charge of about 2.7 grams of maleic anhydride was added to the polymer solution and dissolved. This was followed by the 60 minutes metered addition to the reactor of a solution containing about 1.6 gms DTBP dissolved in about 12.3 gms of heptane. The grafting reaction was allowed to continue for 30 minutes beyond the 60 minutes allotted for the initiator feed. The purge gas was then redirected to flow under the polymer solution for 4 hours in order to strip the unreacted maleic anhydride. The DTBP promoted grafting of the maleic anhydride onto the polymer backbone forming the corresponding succinic anhydride (SA) acylated graft polymer.

The next step is grafting of 1-vinylimidazole (VIMA) onto the acylated graft polymer prepared in the previous step. To carry out this segment of the preparation, two solutions were prepared, one containing about 2 grams of VIMA dissolved in about 14.3 gms of acetone and the other containing about 1.5 gms of DTBP dissolved in about 12.4 gms of heptane. Using syringe pumps, these solutions were delivered simultaneously to the reactor over a 60 minutes period. The grafting reaction was then allowed to proceed for an additional 30 minutes beyond the 60 minutes allotted for the initiator feed. After the VIMA reaction was essentially complete a charge of about 5.7 gms of N-phenyl-1,4-phenylenediamine was slowly added to the mixture and reacted with the acyl groups on the dual graft polymer formed in the previous step over a period of 4 hours, thereby, generating the dual-monomer graft polymer product. This product exhibited a Rapid ADT response of 8.

Example 2 of Graft Polymer Preparation

A 2 liter reactor equipped with an electric heating mantle, stirrer, thermometer, metering syringe pump feed systems and a gas inlet was charged with 1000 grams of a 12.5% ethylene-propylene polymer solution. The solution was prepared by dissolving about 125 grams of the polymer, Polimeri Europa CO-043 in 875 gms of a commercially available hydrorefined base stock, ExxonMobil EHC-60.

The gas inlet permits the gas to be fed either below or above the surface of the solution. The solution was heated to 170° C. and maintained at temperature throughout the preparation. During heating, the polymer solution was purged with an inerting gas ($CO_2$) fed below the surface of the solution. When the solution reached the temperature of 170° C., the purge gas was redirected to flow over the surface of the polymer solution. The flow of the blanketing gas was maintained throughout the preparation of the graft polymer.

A single charge of about 7.5 grams of maleic anhydride was then added to the polymer solution and dissolved. This was followed by the 60 minutes metered addition to the reactor of a solution containing about 4 gms DTBP dissolved in about 10.2 gms of heptane. The purge gas was then redirected to flow under the polymer solution for 4 hours in order to strip the unreacted maleic anhydride. The DTBP promoted grafting of the maleic anhydride onto the polymer backbone forming the corresponding succinic anhydride (SA) acylated graft polymer.

The next step is grafting of 1-vinylimidazole (VIMA) onto the acylated graft polymer prepared in the previous step. To carry out this segment of the preparation, two solutions were prepared, one containing about 5 grams of VIMA dissolved in about 10.4 gms of acetone and the other containing about 3 gms of DTBP dissolved in about 10.7 gms of heptane. Using syringe pumps, these solutions were delivered simultaneously to the reactor over a 60 minutes period. The grafting reaction was then allowed to proceed for an additional 30 minutes beyond the 60 minutes allotted for the initiator feed.

After the VIMA reaction was essentially complete a charge of about 14 gms of N-phenyl-1,4-phenylenediamine were slowly added to the mixture and allowed to react with the acyl groups on the dual graft polymer formed in the previous step over a period of 4 hours, thereby, generating the dual-monomer graft polymer product having about 7 moles of soot controlling monomer per mole of polymer and about 7.5 moles of sludge and varnish controlling monomer per mole of polymer. The product exhibited a Rapid ADT response of 8.

Example 3 of Graft Polymer Preparation

A 5 liter reactor equipped with an electric heating mantle, stirrer, thermometer, syringe pump feed systems and a gas inlet was charged with 3602.5 grams of a 12.5% ethylene-propylene polymer solution. The solution was prepared by dissolving about 450.3 gms of the polymer, Polimeri Europa CO-043 in 3152.2 gms of a commercially available hydrorefined base stock, ExxonMobil EHC-60.

The gas inlet permits the gas to be fed either below or above the surface of the solution. The solution was heated to 170° C. During heating, the polymer solution was purged with an inerting gas ($CO_2$) fed below the surface of the solution. When the solution reached the temperature of 170° C., the purge gas was redirected to flow over the surface of the polymer solution and maintained throughout the preparation of the graft polymer.

A single charge of about 21.29 grams of maleic anhydride was added to the polymer solution and dissolved. This was followed by the continuous metered addition to the reactor of about 13.44 gms DTBP dissolved in heptane and made up to 30 ml. The DTBP solution was introduced over a period of 90 minutes. The maleic anhydride grafting reaction was allowed to proceed for an additional 30 minutes after all of the DTBP was introduced. The purge gas (inerting gas) was then redirected to flow under the polymer solution for 4 hours in order to strip the unreacted maleic anhydride. The DTBP promoted grafting of the maleic anhydride onto the polymer backbone forming the corresponding succinic anhydride (SA) acylated graft polymer.

Afterwards, the VIMA was grafted onto the acylated graft polymer prepared in the previous step. To carry out this segment of the preparation, two solutions, one in which about 18.04 grams of VIMA was dissolved in acetone and made up to about 20 ml and, the other, in which 10.8 grams of DTBP was blended with heptane and made up to 20 ml. These solutions were fed, simultaneously, to the reactor, over a period of 60 minutes. The grafting reaction was allowed to proceed for an additional 30 minutes beyond the 60 minutes allotted for the initiator feed.

After the VIMA reaction was essentially complete, the reactor was cooled to room temperature (about 70° F.) and a charge of about 43.82 gms of N-phenyl-1,4-phenylenediamine was added all at once to the reactor. The reactor temperature was raised to 170° C. and the N-phenyl-1,4-phenylenediamine was allowed to react with the acylated dual graft polymer formed in the previous step for about 4 hours, thereby, generating the dual-monomer graft polymer product having approximately 7.1 moles of soot controlling monomer per mole of polymer and about 7.4 moles of sludge and varnish controlling monomer per mole of polymer. This product exhibited a Rapid ADT response of 8.

Example 4 of Graft Polymer Preparation Using Melt Blending

A 1 liter resin kettle equipped with an electric heating mantle, stirrer, thermometer, metering syringe pump feed system and a gas inlet was charged with 500 grams of a 10% polymer solution. The solution was prepared by dissolving 50 grams of a commercial graft polymer, Fusabond N MF416D, in 450 grams of ExxonMobil EHC-60 base oil. Fusabond N MF416D (E. I. DuPont Canada Co., Mississauga, Ontario, Canada) is an acylated polymer which was prepared via a reactive extrusion process in which maleic anhydride was grafted onto the base ethylene-propylene polymer using a twin screw counter-rotating extruder.

The gas inlet permits the gas to be fed either below or above the surface of the solution. The solution was heated to 170° C. and maintained at temperature throughout the preparation. During heating, the polymer solution was purged with an inerting gas ($CO_2$) fed below the surface of the solution. When the solution reached the temperature of 170° C., the purge gas was redirected to flow over the surface of the polymer solution. The flow of the blanketing gas was maintained throughout the preparation of the graft polymer.

This melt-processed acylated graft polymer was grafted with the VIMA. To carry out this segment of the preparation, about 2.5 gms of VIMA were dissolved in acetone and made up to 12 ml. and fed, simultaneously, into the reactor with a charge of DTBP solution containing about 1.5 gms of DTBP dissolved in heptane and made up to 12 ml. These solutions were also fed into the reactor over a period of one hour using the syringe pumps. The solution continued to react for an additional 30 minutes. After the VIMA reaction was essentially complete a charge of about 0.86 gms of N-phenyl-1,4-phenylenediamine was added slowly to the mixture. The inerting gas ($CO_2$) was redirected to flow through the solution and the solution was allowed to react with the acyl groups for 2 hours, thereby, generating the dual-monomer graft polymer product. The product exhibited a Rapid ADT response of 8.

Example 5 of Graft Polymer Preparation Using Alternate Reaction Components

The experiments of Examples 1-3 are repeated, using conditions similar to those of the previous Examples, with each possible combination of the acylating agents, amines, solvents, polymers, graftable monomers, and initiators identified earlier in this application. Grafted polymers are formed which have utility for controlling soot and viscosity as well as for controlling sludge and varnish.

Demonstration of Performance
Peugeot XUD11 Screener Engine Test

The capability of the dual-monomer graft polymer to control soot and viscosity increase was demonstrated using the Peugeot XUD11 Screener Engine Test. As noted, the test measures percent soot in the oil and viscosity change (in terms of percent viscosity change, e.g., percent viscosity increase), with higher percentages of soot in the oil indicating better performance and lower values of viscosity increase indicating better performance.

Four formulations were tested in Peugeot XUD11 Screener Engine Test. Each of the formulations uses a similar base package, namely, the same composition and concentration of DI (dispersant/inhibitor) package and the same concentration of non-dispersant polymer, namely, non-dispersant viscosity modifier. The primary difference between them is in the concentration and type of dispersant polymer employed in the formulation.

Since the Peugeot XUD11 Screener Engine Test evaluates soot handling and viscosity control, the compositional variable of importance is the concentration of the "soot handling" monomer, the reaction product between amine compound and the acylated polymer, namely, the succinimide type substituent. The engine oil formulations, therefore, were designed to assess dispersant polymer performance with respect to soot handling and viscosity control.

Therefore, since Comparative Polymer B is grafted with approximately 15 moles of the succinimide substituent per mole polymer, on an equal polymer weight basis it is grafted with approximately two-times as much of succinimide as compared with the multi-functional polymer of the present invention. As a result, in order to achieve equivalent concentrations of the active component in the formulated test blends, the polymer solids treat rate of Comparative Polymer B was reduced as compared with the treat rate of the multi-functional polymer prepared in accordance with the present invention. This difference was reflected by the polymer solids concentration used to formulate Blend-2 and Blend-3.

The engine oils were formulated as follows. The oil formulated as Blend-1 contained 5.7 wt. % of Comparative Polymer A, a VIMA based dispersant polymer solution which contained approximately 12.5 wt. % polymer solids and exhibited an ADT response of 16 as described in U.S. Pat. Nos. 5,523,008 and 5,663,126. The formulation identified as Blend-2 contained about 5.7 wt. % of a multi-functional graft polymer which was prepared in accordance with the present invention, Example 2. As noted, the product contained about 7 moles of each active ingredient, or monomer, namely, VIMA and a succinimide type substituent, per mole of polymer. The formulation, Blend-3, contained about 2.74 wt. % of Comparative Polymer B, a commercial dispersant polymer solution, Hitec-5777. This product contains approximately 13.5 wt. % polymer solids and was grafted with about 15 moles of succinimide type monomer per mole of polymer. The formulation identified as Blend-4, was also formulated using Comparative Polymer B, however, at a treat rate of about 1.65 wt. %. In addition to Comparative Polymer B, Blend-4 was also formulated with about 4.8 wt. % Comparative Polymer C, a VIMA based dispersant polymer solution which contained approximately 12.5 wt. % polymer solids and exhibited an ADT response of 8 as described in U.S. Pat. Nos. 5,523,008 and 5,663,126.

In terms of graft polymer concentrations in the engine oil blends, Blend-2 was formulated with 5.7 wt. % of the multi-functional polymer prepared in accordance with the present invention. Blend-3 was formulated using 2.74 wt. % of Comparative Polymer B while Blend-4 was formulated using 1.65 wt. % of Comparative Polymer B. In addition to Comparative Polymer B, Blend-4 was formulated with 4.8 wt. % Comparative Polymer C. Blend-1, which was formulated using Comparative Polymer A, was formulated without any soot handling active ingredient, namely, the succinimide monomer.

The results of the Peugeot XUD 11 Screener Engine Test for the four blend formulations are presented in Table 1.

TABLE 1

PERFORMANCE COMPARISON BETWEEN MULTIPLE-DISPERSANT POLYMER (SUCCINIMIDE/VIMA CHEMICAL MIXTURE) AND COMMERCIAL SUCCINIMIDE PRODUCT USING THE XUD11 SCREENER ENGINE TEST

| Parameter | Blend-1: Base Blend 1 with Comparative Polymer A | Blend-2: Base Blend formulated with Product of Example 2 | Blend-3: Base Blend 1 with Comparative Polymer B | Blend-4: Base Blend 1 with Comparative Polymer B and Comparative Polymer C |
|---|---|---|---|---|
| % DI Package | 5.17 | 5.17 | 5.17 | 5.17 |
| % Graft Polymer solids | 0.72 | 0.72 | 0.36 | 0.72 |
| Relative concentration of Active Monomer Component | 0 | 1.0 | 1.07 | 0.64 |
| KVis, cSt @100° C. | 11.31 | 11.44 | 9.45 | 10.79 |
| % Soot at EOT | 1.5 (25 hrs) | 2.89 (20 hrs) | 2.62 (21 hrs) | 2.44 (19 hrs) |
| % Vis Inc EOT | 251 | 53 | 43 | 52 |
| % Vis Inc, 3% soot | | 58 | 55 | 80 |

EOT = End of test

The test results in Table 1 demonstrate that Blend-1, formulated with the VIMA based dispersant polymer as described in U.S. Pat. No. 5,523,008 and U.S. Pat. No. 5,663,126 is unable to suspend soot and to control viscosity increase. The results also demonstrate that the Blend-2 formulation containing the multi-functional polymer of the present invention performs very well in suspending soot and controlling viscosity increase. Indeed, the overall performance of the multi-functional polymer is comparable to Comparative Polymer B and, possibly, directionally better than Comparative Polymer B in suspending soot as illustrated by test results for Blend-3. The results of Blend-4 compared with Blend-3 indicates that soot suspension degrades at reduced treat rates of the soot handling polymer.

Sequence VG Engine Test

To confirm that the dual-monomer graft polymer is capable of controlling sludge and varnish, two engine oils were blended and tested using the Sequence VG Engine Test, a test, as noted, designed to evaluate an oil's ability to control sludge and varnish.

The two oils which were tested used the same borderline failing DI (dispersant/inhibitor) package. One of the oils was blended using a 1-vinylimidazole dispersant polymer ("Comparative Polymer C") exhibiting an ADT response of 8 as described in U.S. Pat. No. 5,523,008 and U.S. Pat. No. 5,663,126, and the other was blended using the product of Example 3, the multi-functional polymer of the present invention, exhibiting an ADT response of 8. As compared with the comparative example presented in Table 2, the formulation blended using the polymer of the present invention contained about 16% less active ingredient in the form of grafted VIMA. The results of the Seq. VG Engine Test are shown in Table 2.

TABLE 2

SEQ. VG TEST PERFORMANCE COMPARISON BETWEEN MULTIPLE-DISPERSANT POLYMER (SUCCINIMIDE/VIMA CHEMICAL MIXTURE) AND VIMA

| Test Parameter | Passing Limits | Comparative Example Base Blend 2 with Comparative Polymer B | Invention Base Blend 2 using product of Example 3 |
|---|---|---|---|
| VIMA Concentration | | Reference = 100% | 84% of Reference |
| Average Engine Sludge | 7.8 Min. | 7.54 | 8.77 |
| Rocker Arm Cover Sludge | 8.0 Min. | 8.76 | 9.51 |
| Oil Screen Clogging | 20% Max. | 96% | 0 |
| Hot Stuck Rings | 0 | 0 | 0 |
| Average Engine Varnish | 8.9 Min. | 8.82 | 9.16 |
| Average Piston Skirt Varnish | 7.5 Min. | 7.94 | 8.15 |
| Performance Assessment | | FAIL | PASS |

The performance targets for the various test parameters evaluated in the Sequence VG Engine Test, listed in Table 2, represent either maximum or minimum values. Hence, an Average Engine Sludge value of 7.54 for the Comparative Example is a failing result since the minimum requirement for passing the test is 7.8. The Comparative Example also fails to meet the passing limit for engine varnish with a value of 8.82 as compared with a minimum passing limit of 8.9. In addition, the Comparative Example reached an oil screen clogging percent of 96% which far exceeds the maximum limit of 20%.

The results in Table 2 indicate that Comparative Polymer B failed the Seq. VG Test while the multi-functional polymer of the present invention convincingly passed.

We claim:

1. A multiple function dispersant graft polymer containing at least two different grafted monomers, each directly grafted to a polyolefin polymer backbone having a weight average molecular weight of from about 10,000 to about 1,000,000, the polyolefin polymer backbone having graftable sites, in which:

a first grafted monomer comprises an ethylenically unsaturated, aromatic monomer selected from the group consisting of 1-vinylimidazole, N-allylimidazole, 2-vinylpyridine, 4-vinylpyridine, 4-methyl-5-vinyl thiazole, N-allyl diisooctyl phenothiazine, 2-methyl-1-vinylimidazole, 3-methyl-1-vinylpyrazole, N-vinylpurine, and combinations thereof; and a second grafted monomer comprises an acylating agent with which at least one amine has been reacted, wherein said amine is selected from the group consisting of N-phenylphenylenediamines, N-phenyl-1,4-phenylenediamine, N-phenyl-1,3-phenylenediamine, N-phenyl-1,2-phenylenediamine, N-naphthylphenylenediamine, N-phenylnaphthalenediamine, N'-aminopropyl-N-phenylphenylenediamine, N-arylphenylenediamines represented by the formula:

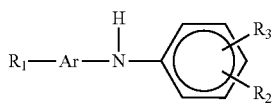

in which Ar is aromatic and $R_1$ is hydrogen, —NH-aryl, —NH-arylalkyl, —NH-alkylaryl, or a branched or straight chain radical having from 4 to 24 carbon atoms and the radical can be an alkyl, alkenyl, alkoxyl, arylalkyl, alkylaryl, hydroxyalkyl or aminoalkyl radical, $R_2$ is —$NH_2$, —$NH(CH_2)_n$—$)_m$—$NH_2$, —$CH_2$—$(CH_2)_n$—$NH_2$, -aryl-$NH_2$, in which n and m each has a value from 1 to 10, and $R_3$ is hydrogen or an alkyl, alkenyl, alkoxyl, arylalkyl, or alkylaryl radical, which may have from 4 to 24 carbon atoms; and

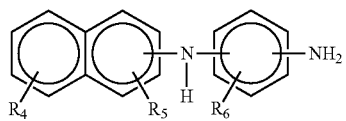

in which $R_4$, $R_5$, and $R_6$ are hydrogen or a linear or branched hydrocarbon radical containing from 1 to 10 carbon atoms and that radical may be an alkyl, alkenyl, alkoxyl, alkylaryl, arylalkyl, hydroxyalkyl, or aminoalkyl radical, and $R_4$, $R_5$ and $R_6$ can be the same or different;
aminocarbazoles represented by the formula:

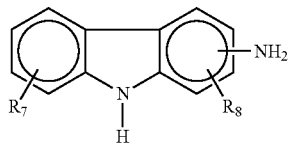

in which $R_7$ and $R_8$ represent hydrogen or an alkyl, alkenyl, or alkoxyl radical having from 1 to 14 carbon atoms, and $R_7$ and $R_8$ can be the same or different;
aminoindoles represented by the formula:

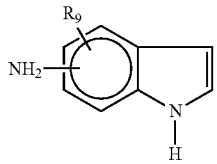

in which $R_9$ represents hydrogen or an alkyl radical having from 1 to 14 carbon atoms, amino-indazolinones represented by the formula:

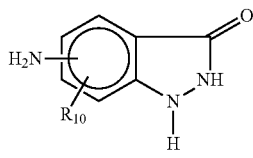

in which $R_{10}$ is hydrogen or an alkyl radical having from 1 to 14 carbon atoms, aminomercaptotriazole represented by the formula:

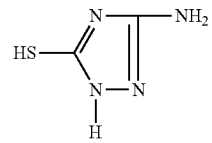

aminoperimidines represented by the formula:

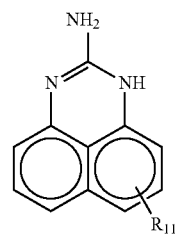

in which $R_{11}$ represents hydrogen or an alkyl or alkoxyl radical having from 1 to 14 carbon atoms and combinations thereof,
which has from about 1 mole to about 74 moles of first graft monomer per mole of backbone polymer and from about 1 mole to about 74 moles of second graft monomer per mole of backbone polymer, wherein the total moles of first graft monomer and second graft monomer per mole of backbone polymer is not greater than 75 moles;
wherein the multiple function dispersant graft polymer has a Rapid ADT response of at least 4.

2. The multiple function dispersant polymer of claim 1, wherein said polymer backbone has a weight average molecular weight of from about 10,000 to about 500,000.

3. The multiple function dispersant polymer of claim 1, wherein said polymer backbone has a polydispersity of from about 1 to about 15.

4. The multiple function dispersant polymer of claim 1, wherein said polymer backbone comprises a polyolefin having a weight average molecular weight of from about 10,000 to about 500,000 and a polydispersity from about 1 to about 15.

5. The multiple function dispersant graft polymer of claim 1, wherein said ethylenically unsaturated monomer is selected from the group consisting of 1-vinylimidazole N-allylimidazole, 2-vinylpyridine, 4-vinylpyridine, 2-methyl-1-vinylimidazole, and combinations thereof.

6. The multiple function dispersant graft polymer of claim 5, wherein said acylating agent is selected from the group consisting of maleic acid, fumaric acid, maleic anhydride, and combinations thereof.

7. The multiple function dispersant graft polymer of claim 5, wherein said amine is selected from the group consisting of N-phenylphenylenediamines, N-phenyl-1,4-phenylenediamine, N-phenyl-1,3-phenylenediamine, N-phenyl-1,2-phenylenediamine, N-naphthylphenylenediamine, N-phenylnaphthalenediamine, N'-aminopropyl-N-phenylphenylenediamine,

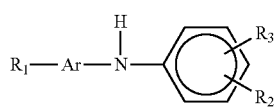

and combinations thereof.

8. The multiple function dispersant graft polymer of claim 7,
wherein said polymer backbone comprises a polyolefin having a weight average molecular weight of from about 10,000 to about 500,000 and a polydispersity from about 1 to about 15; and
wherein said acylating agent is selected from the group consisting of maleic acid, fumaric acid, maleic anhydride, and combinations thereof,
the multiple function dispersant graft polymer has from about 5 moles to about 50 moles of first graft monomer per mole of backbone polymer and from about 5 moles to about 50 moles of second graft monomer per mole of backbone polymer.

9. The multiple function dispersant graft polymer of claim 1, wherein said amine is N-phenyl-1,4-phenylenediamine.

10. The multiple function dispersant polymer of claim 1, having a Rapid ADT response of from about 4 to about 32.

11. The multiple function dispersant polymer of claim 1, having a Rapid ADT response of from about 4 to about 16.

12. The multiple function dispersant graft polymer of claim 1, wherein said first graft monomer is 1-vinylimidazole; said second graft monomer is selected from the group consisting of maleic acid, fumaric acid, maleic anhydride, and combinations thereof; and said amine is N-phenyl-1,4-phenylenediamine.

13. The multiple function dispersant graft polymer of claim 12,
wherein said polymer backbone comprises a polyolefin having a weight average molecular weight of from about 10,000 to about 500,000 and a polydispersity from about 1 to about 15; and
the multiple function dispersant graft polymer has from about 5 moles to about 50 moles of first graft monomer per mole of backbone polymer and from about 5 moles to about 50 moles of second graft monomer per mole of backbone polymer.

14. The multiple function dispersant graft polymer of claim 12, which has from about 5 moles to about 50 moles of first graft monomer per mole of backbone polymer and from about 5 moles to about 50 moles of second graft monomer per mole of backbone polymer.

15. The multiple function dispersant graft polymer of claim 12, wherein the ratio of the first graft monomer to the second graft monomer is from about 0.3:1 to about 1:0.3.

16. A graft polymer according to claim 12, wherein
the N-vinyl imidazole is present in an amount to sufficient to impart the graft polymer with dispersancy associated with sludge and varnish handling; and
the N-phenyl-1,4-diamine reacted to the acylating agent is present in an amount to sufficient to impart the graft polymer with soot handling performance.

17. The multiple function dispersant polymer of claim 1 having about 7 moles of first graft monomer per mole of backbone polymer and about 7 moles of second graft monomer per mole of backbone polymer.

18. The multiple function dispersant polymer of claim 1, which has from about 3 moles to about 60 moles of first graft monomer per mole of backbone polymer and from about 3 moles to about 60 moles of second graft monomer per mole of backbone polymer.

19. The multiple function dispersant polymer of claim 18, which has from about 5 moles to about 50 moles of first graft monomer per mole of backbone polymer and from about 5 moles to about 50 moles of second graft monomer per mole of backbone polymer.

20. The graft polymer of claim 1, which has a Rapid ADT response of at least about 8.

21. The multiple function dispersant graft polymer of claim 1, wherein the ratio of the first graft monomer to the second graft monomer is from about 0.3:1 to about 1:0.3.

22. The multiple function dispersant graft polymer of claim 1, prepared by a process comprising:
grafting the acylating agent on the polymer backbone; and then
grafting the ethylenically unsaturated monomer on the polymer backbone; and then
reacting the amine with the acylating reagent.

* * * * *